United States Patent
Bidner et al.

(10) Patent No.: US 12,023,983 B2
(45) Date of Patent: Jul. 2, 2024

(54) METHODS AND SYSTEMS FOR INSTANT CABIN HEAT FOR A VEHICLE

(71) Applicant: Ford Global Technologies, LLC, Dearborn, MI (US)

(72) Inventors: David Bidner, Livonia, MI (US); Ross Pursifull, Dearborn, MI (US); Debasish Dhar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 195 days.

(21) Appl. No.: 17/211,678

(22) Filed: Mar. 24, 2021

(65) Prior Publication Data
US 2022/0305876 A1 Sep. 29, 2022

(51) Int. Cl.
*B60H 1/00* (2006.01)
*B60H 1/03* (2006.01)

(52) U.S. Cl.
CPC ..... *B60H 1/00314* (2013.01); *B60H 1/00007* (2013.01); *B60H 1/0073* (2019.05);
(Continued)

(58) Field of Classification Search
CPC ............ B60H 1/00642; B60H 1/00735; B60H 1/00885; B60H 1/00899; B60H 1/034;
(Continued)

(56) References Cited

U.S. PATENT DOCUMENTS 5,669,231 A * 9/1997 Itoh ..................... B60H 1/00907
62/223
5,704,219 A * 1/1998 Suzuki ............... B60H 1/00907
62/197

(Continued)

FOREIGN PATENT DOCUMENTS

CN 102692100 A * 9/2012 ......... B60H 1/00042
CN 104802613 A * 7/2015 ......... B60H 1/00899
(Continued)

OTHER PUBLICATIONS

"Third Row Tesla Podcast—Episode 14—Tesla Manufacturing with Sandy Munro and Elon Musk!," YouTube Website, Available Online at https://www.youtube.com/watch?v=pih4kU6yvz8, Apr. 14, 2020, 4 pages.

*Primary Examiner* — Jenna M Maroney
(74) *Attorney, Agent, or Firm* — Vincent Mastrogiacomo; McCoy Russell LLP

(57) ABSTRACT

Methods and system for providing heat to a vehicle are presented, whereby a refrigerant loop is operated to heat a cabin of the vehicle via heat generated by a compressor and heat generated by a resistive heating element. The heat generated by the compressor and the heat generated by the resistive heating element are transferred to a refrigerant before it is transferred to the cabin. In one example, in a first mode, an evaporator bypass valve on an evaporator bypass conduit of the A/C system is opened to route the refrigerant around an evaporator of the A/C system to increase a temperature of the refrigerant in the refrigerant loop; and in a second mode, the evaporator bypass valve is closed to route the refrigerant through the evaporator, where heat is released to a flow of air across the evaporator that is directed to the vehicle cabin.

15 Claims, 10 Drawing Sheets

(52) U.S. Cl.
CPC ..... *B60H 1/00828* (2013.01); *B60H 1/00914* (2013.01); *B60H 1/034* (2013.01)

(58) Field of Classification Search
CPC ........ B60H 1/2218; B60H 2001/00949; B60H 2001/2265; B60H 2001/3248; B60H 2001/3255; B60H 2001/3272; B60H 1/00907; B60H 1/00914; B60H 1/2215; B60H 201/2265; B60H 1/02; B60H 1/00828; B60H 1/00864
See application file for complete search history.

(56) References Cited

U.S. PATENT DOCUMENTS

| | | | | |
|---|---|---|---|---|
| 5,996,360 | A * | 12/1999 | Tanaka | F25B 43/006 62/509 |
| 6,351,956 | B1 | 3/2002 | Chen et al. | |
| 6,449,974 | B1 * | 9/2002 | Kampf | F25B 5/00 62/324.1 |
| 7,182,129 | B2 * | 2/2007 | Karl | B60H 1/025 62/238.7 |
| 8,320,096 | B2 | 11/2012 | Harnett | |
| 8,332,098 | B2 | 12/2012 | Major et al. | |
| 8,528,354 | B2 * | 9/2013 | Esaki | B60H 1/00921 62/239 |
| 8,910,489 | B2 * | 12/2014 | Choi | B60H 1/143 62/185 |
| 9,452,659 | B2 | 9/2016 | Styles et al. | |
| 10,377,205 | B2 | 8/2019 | Pursifull | |
| 10,391,836 | B2 | 8/2019 | Suzuki et al. | |
| 10,953,725 | B2 | 3/2021 | Dhar et al. | |
| 2002/0035843 | A1 * | 3/2002 | Kampf | F25B 5/00 62/160 |
| 2002/0095943 | A1 * | 7/2002 | Hatakeyama | B60H 1/00914 62/324.1 |
| 2006/0144047 | A1 * | 7/2006 | Inaba | F02N 19/10 123/142.5 R |
| 2008/0295535 | A1 * | 12/2008 | Robinet | H01M 10/663 62/259.2 |
| 2009/0113913 | A1 * | 5/2009 | Esaki | F25B 6/04 62/239 |
| 2011/0167849 | A1 * | 7/2011 | Kobayashi | B60H 1/00921 62/159 |
| 2013/0227973 | A1 * | 9/2013 | Kang | B60H 1/00921 62/140 |
| 2014/0041826 | A1 * | 2/2014 | Takeuchi | B60L 1/08 165/10 |
| 2015/0210141 | A1 * | 7/2015 | Ragazzi | B60H 1/00899 62/93 |
| 2015/0273981 | A1 * | 10/2015 | Kang | F25B 6/04 62/419 |
| 2015/0298522 | A1 | 10/2015 | Jirabayashi et al. | |
| 2015/0308719 | A1 * | 10/2015 | Gebbie | B60H 1/00921 62/324.1 |
| 2016/0082805 | A1 * | 3/2016 | Graaf | B60H 1/04 62/238.7 |
| 2016/0121691 | A1 * | 5/2016 | Liu | B60H 1/3213 62/115 |
| 2017/0240024 | A1 * | 8/2017 | Blatchley | B60H 1/3213 |
| 2019/0070924 | A1 * | 3/2019 | Mancini | B60H 1/00564 |
| 2019/0111756 | A1 * | 4/2019 | Makimoto | B60H 1/004 |
| 2019/0315194 | A1 * | 10/2019 | Kim | B60H 1/00278 |
| 2019/0366800 | A1 * | 12/2019 | Durrani | B60H 1/00485 |
| 2020/0086714 | A1 * | 3/2020 | Dhar | B60H 1/3227 |
| 2020/0086715 | A1 | 3/2020 | Pursifull | |
| 2020/0101814 | A1 * | 4/2020 | Takagi | B60H 1/00392 |
| 2020/0220236 | A1 * | 7/2020 | Durrani | H01M 10/663 |
| 2020/0250898 | A1 * | 8/2020 | Rafferty | B60H 1/00657 |
| 2020/0282806 | A1 * | 9/2020 | Sharma | B60H 1/00907 |
| 2022/0242194 | A1 * | 8/2022 | Takagi | B60H 1/2215 |
| 2022/0258558 | A1 * | 8/2022 | Lee | B60H 1/32 |
| 2022/0412611 | A1 * | 12/2022 | Brown | F25B 6/02 |

FOREIGN PATENT DOCUMENTS

| | | | | |
|---|---|---|---|---|
| CN | 105034744 A | * | 11/2015 | ......... B60H 1/00314 |
| CN | 105522931 A | * | 4/2016 | ......... B60H 1/00278 |
| CN | 106103154 A | * | 11/2016 | ......... B60H 1/00278 |
| CN | 106335339 A | * | 1/2017 | ......... B60H 1/00278 |
| CN | 106335339 B | * | 9/2021 | ......... B60H 1/00278 |
| DE | 19956252 A1 | * | 5/2000 | ......... B60H 1/00914 |
| DE | 10156310 C1 | * | 11/2002 | ............. B60H 1/005 |
| DE | 10253357 A1 | | 6/2004 | |
| DE | 60300058 T2 | * | 2/2006 | ............. B60H 1/3208 |
| DE | 602005001770 T2 | * | 4/2008 | ......... B60H 1/00907 |
| DE | 102012113103 A1 | * | 3/2014 | ......... B60H 1/00921 |
| DE | 102020109385 A1 | * | 12/2020 | |
| DE | 102020111505 A1 | * | 12/2020 | |
| DE | 102021101127 A1 | * | 9/2021 | ......... B60H 1/00278 |
| EP | 1039164 A2 | | 9/2000 | |
| EP | 1728657 A1 | * | 12/2006 | ......... B60H 1/00907 |
| EP | 1329344 B1 | * | 2/2008 | ......... B60H 1/00392 |
| EP | 2572910 A1 | * | 3/2013 | ......... B60H 1/00921 |
| FR | 2917672 A3 | * | 12/2008 | ......... B60H 1/00914 |
| FR | 2946415 A1 | * | 12/2010 | ......... B60H 1/00492 |
| FR | 2993642 A1 | * | 1/2014 | ......... B60H 1/00764 |
| FR | 3026173 A1 | * | 3/2016 | ......... B60H 1/00921 |
| JP | 08020236 A | * | 1/1996 | ......... B60H 1/00735 |
| JP | 2002283836 A | * | 10/2002 | ......... B60H 1/00392 |
| JP | 3595542 B2 | * | 12/2004 | |
| JP | 2020142789 A | * | 9/2020 | ......... B60H 1/00921 |
| WO | WO-2007090965 A1 | * | 8/2007 | ......... B60H 1/00278 |
| WO | WO-2013087425 A1 | * | 6/2013 | ......... B60H 1/00007 |
| WO | WO-2016042699 A1 | * | 3/2016 | ............. B60H 1/00 |
| WO | WO-2020129493 A1 | * | 6/2020 | |
| WO | WO-2020242096 A1 | * | 12/2020 | |

* cited by examiner

METHODS AND SYSTEMS FOR INSTANT CABIN HEAT FOR A VEHICLE

FIELD

The present description relates generally to methods and systems for providing instant cabin heat for a vehicle, and more specifically, using heat from a compressor to provide the instant cabin heat.

BACKGROUND/SUMMARY

Automotive air conditioning (A/C) systems and heating systems provide driver comfort by adjusting a temperature of a vehicle cabin to a desired cabin temperature. With heating systems, a flow of hot air is typically generated by flowing air around a heat-air exchanger (e.g., a heater core) that is heated by engine waste heat via a circulation of coolant. With A/C systems, a cooling air is typically generated by flowing air around an evaporator that is cooled when a refrigerant expands in the evaporator, thereby absorbing heat from the surrounding air. The refrigerant vapors from the evaporator then enter a compressor, where they are compressed to a high pressure. The pressurized refrigerant vapors from the compressor then enter a condenser, where they are converted into a liquid, releasing heat. The pressurized liquid refrigerant from the condenser is then passed through an expansion valve, where it is allowed to expand to form low-pressure liquid refrigerant, which subsequently enters the evaporator, to complete a circulation of the refrigerant through the A/C system.

A/C systems may generate a flow of cool air with little delay, due to a small mass of the refrigerant and a short time to generate heat via a compressor of the A/C system. In contrast, a time taken to heat the vehicle cabin via engine waste heat may be several to tens of minutes, due to a larger mass of engine coolant and a time taken to heat the engine. Additionally, the coolant may have a higher thermal inertia than the refrigerant, whereby the coolant may not heat up and cool down as quickly as the refrigerant. As a result of the time taken to heat the vehicle cabin being several to tens of minutes, a driver of the vehicle may initiate one or more remote starts of the vehicle to warm the vehicle cabin up, resulting in a decreased fuel efficiency of the vehicle and an increased consumption of fuel. Heating the vehicle cabin is possible via electrical resistance heat (e.g., via a battery and/or an alternator), but due to battery/alternator current limits, a cost of implementation may be high.

One approach to providing inexpensive on-demand (e.g., instant) cabin heat is to use the compressor of the A/C system to generate heat, as taught by Dhar et al in U.S. patent application Ser. No. 16/131,987. As the refrigerant circulates through the A/C system, instead of converting the pressurized refrigerant vapors from the compressor into a liquid at the condenser, thereby releasing heat, the pressurized refrigerant vapors are routed around the condenser via a bypass circuit, and heat generated at the compressor and stored in the refrigerant is released at the evaporator. Air is flowed across the evaporator by a blower, heating the air before routing it into the vehicle cabin. An electric heater may also be arranged on a circuit of the A/C system and used to further heat the refrigerant, which may increase an efficacy of the compressor.

However, the inventors herein have recognized potential issues with this approach. As one example, in the implementation of Dhar, as heat from the refrigerant is transferred to the air flowing around the evaporator, an input temperature and a pressure of the refrigerant at an inlet of the compressor may decrease, which may reduce the compressor's ability to add heat/energy to the fluid. As a result of decreased compressor heating, an output temperature of the refrigerant at an outlet of the compressor may be reduced, thereby reducing an amount of heat transferred at the evaporator (e.g., used to generate in-cabin heat). Thus, as heat is taken out of the A/C system to heat the vehicle cabin, a capacity of the A/C system to generate additional heat is reduced, resulting in longer waiting times for in-cabin heat.

In one example, the issue described above may be at least partially addressed by a method for a controller of a vehicle, comprising, in response to a request for heat in the vehicle cabin, heating refrigerant in a refrigerant loop of an air conditioning (A/C) system of the vehicle via a compressor, and in a first mode, opening an evaporator bypass valve on an evaporator bypass conduit of the A/C system to route the refrigerant around an evaporator of the A/C system to increase a temperature of the refrigerant in the refrigerant loop, and in a second mode, closing the evaporator bypass valve to route the refrigerant through the evaporator; and heating the vehicle passenger cabin by flowing air across the evaporator to the vehicle cabin. In this way, by routing the refrigerant around the evaporator in the first mode, heat generated in the refrigerant by the compressor is retained in the A/C system during operation in the first mode. The heat is released from the A/C system at the evaporator during operation in the second mode. As an example, the controller may be in the first mode when the compressor is warming up, and the controller may be in the second mode responsive to the refrigerant reaching a threshold temperature/pressure. As another example, the controller may be in the second mode responsive to the compressor reaching a target speed. Additionally, a release of the heat at the evaporator may be controlled by adjusting a speed of a blower of the vehicle based on the temperature of the refrigerant (e.g., at the compressor inlet) to ensure that the temperature of the refrigerant does not fall below the threshold temperature. By maintaining the heat of the refrigerant at the compressor inlet at or above the threshold temperature, and releasing heat from the A/C system in excess of an amount of heat used to maintain the heat of the refrigerant at the threshold temperature, an efficacy (e.g., a work) of the compressor is maximized. When the efficacy of the compressor is maximized, a heat generation of the A/C system is maximized. In one example, the efficacy of the compressor is maximized when a pressure of the refrigerant at an outlet of the compressor reaches a threshold pressure (e.g., 350 psig).

As one example, a driver enters the vehicle, starts the engine, and turns on instant heat (e.g., via a dashboard control). In response to the driver turning on the instant heat, the controller turns on the compressor (e.g., powered by the engine's front end accessory drive), opens a condenser bypass valve to allow the refrigerant to bypass the condenser, and opens an evaporator bypass valve to allow the refrigerant to bypass the evaporator. The controller may turn on an electric heater arranged on a circuit of the A/C system to supply heat to the refrigerant, and turn off a blower of the vehicle. Heat generated by operation of the compressor is absorbed by the refrigerant as it begins to circulate through the A/C system in the first mode. Because heat generated in the refrigerant by the compressor (and the electric heater) is not transferred to air via the evaporator, the temperature and pressure of the refrigerant increase until the refrigerant reaches the threshold temperature. When the pressure of the refrigerant at the compressor outlet reaches a threshold pressure (e.g., 350 psig) it may be inferred that the threshold temperature is reached, whereby the first mode of operation of instant heat ends, and the second mode of operation of instant heat begins. The evaporator bypass valve is closed and the blower is turned on, whereby air is blown across the evaporator and heat in the refrigerant is transferred to the air at the evaporator, which is blown into the cabin to provide heat. As the temperature of the refrigerant decreases due to the heat transfer at the evaporator, the speed of the blower is adjusted to control a rate of heat transfer at the evaporator to maintain the refrigerant temperature at or above the threshold temperature. By heating the refrigerant as quickly as possible (e.g., by not releasing the heat from the A/C system) in the first mode, and maintaining the refrigerant temperature at or above the threshold temperature in the second mode, the efficacy of the compressor is maximized and a time taken to provide instant heat to the vehicle cabin is minimized. Once the engine has warmed up and a threshold engine coolant temperature is achieved, in-cabin heat may be provided by the heater core, and instant heat via the A/C system may be discontinued. Additionally, an engine idle speed and/or a gear ratio of a transmission of the vehicle (e.g., upon an engagement of one or more gears of the transmission) may be increased to accelerate warming the engine up. Overall, by reducing a time taken for heat to be generated in the vehicle cabin, a use of remote starts to heat the vehicle may be reduced, increasing a fuel efficiency of the vehicle, and a comfort of the driver may be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present description is related to controlling an air conditioning (A/C) system of a vehicle. Specifically, the description involves controlling the automotive A/C system to provide instant heat to a cabin of the vehicle in accordance with the systems and methods described herein. For the purposes of this disclosure, "instant heat" refers to a flow of hot air into the cabin, generated based on a request for heat from a driver of the vehicle, within a threshold amount of time (e.g., 60 seconds), where the threshold amount of time is less than an amount of time taken to heat the cabin via engine waste heat.

Figure 1:
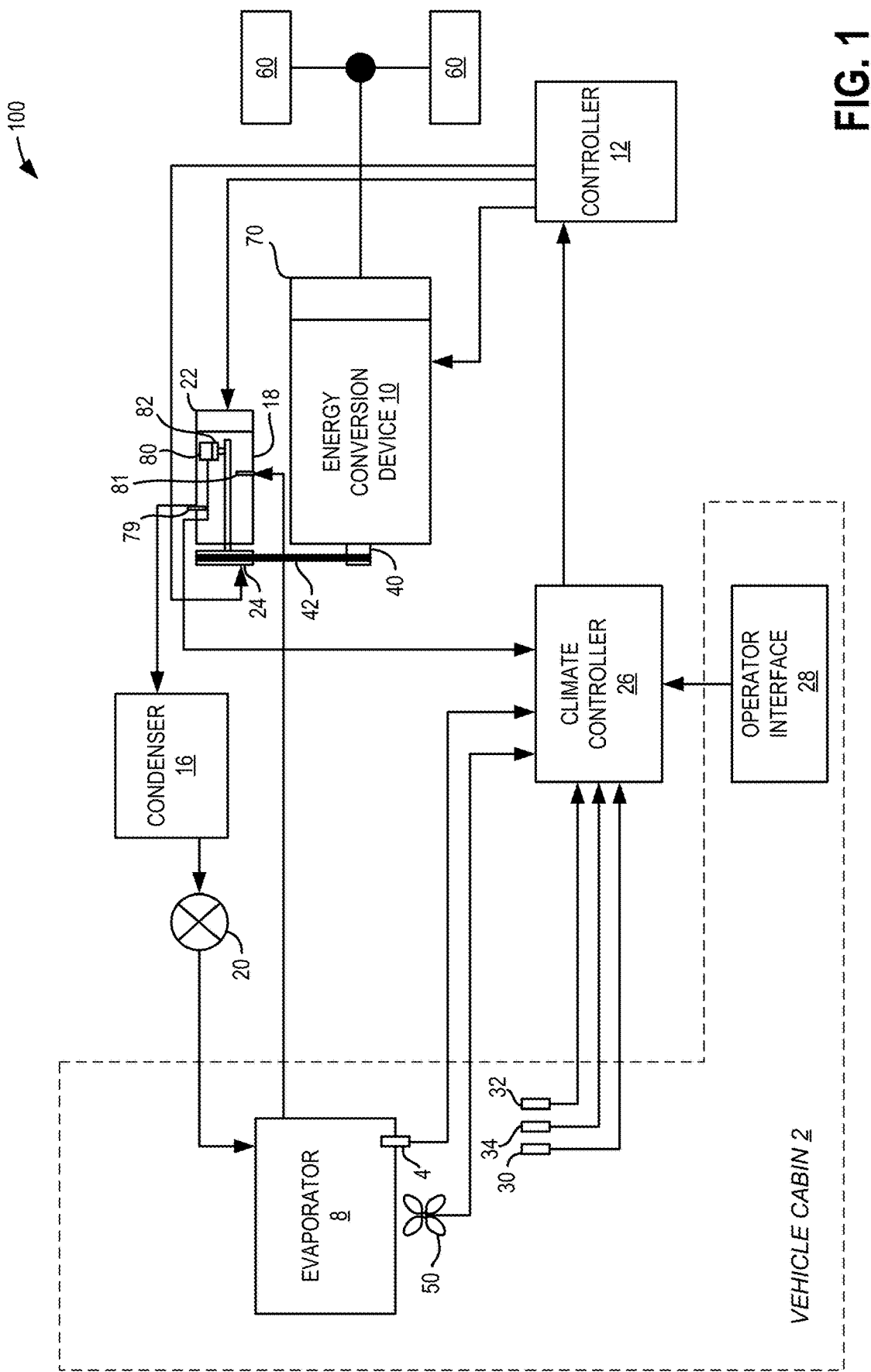
FIG. 1 is a schematic diagram of a typical vehicle air conditioning (A/C) system.
Figure 2A:
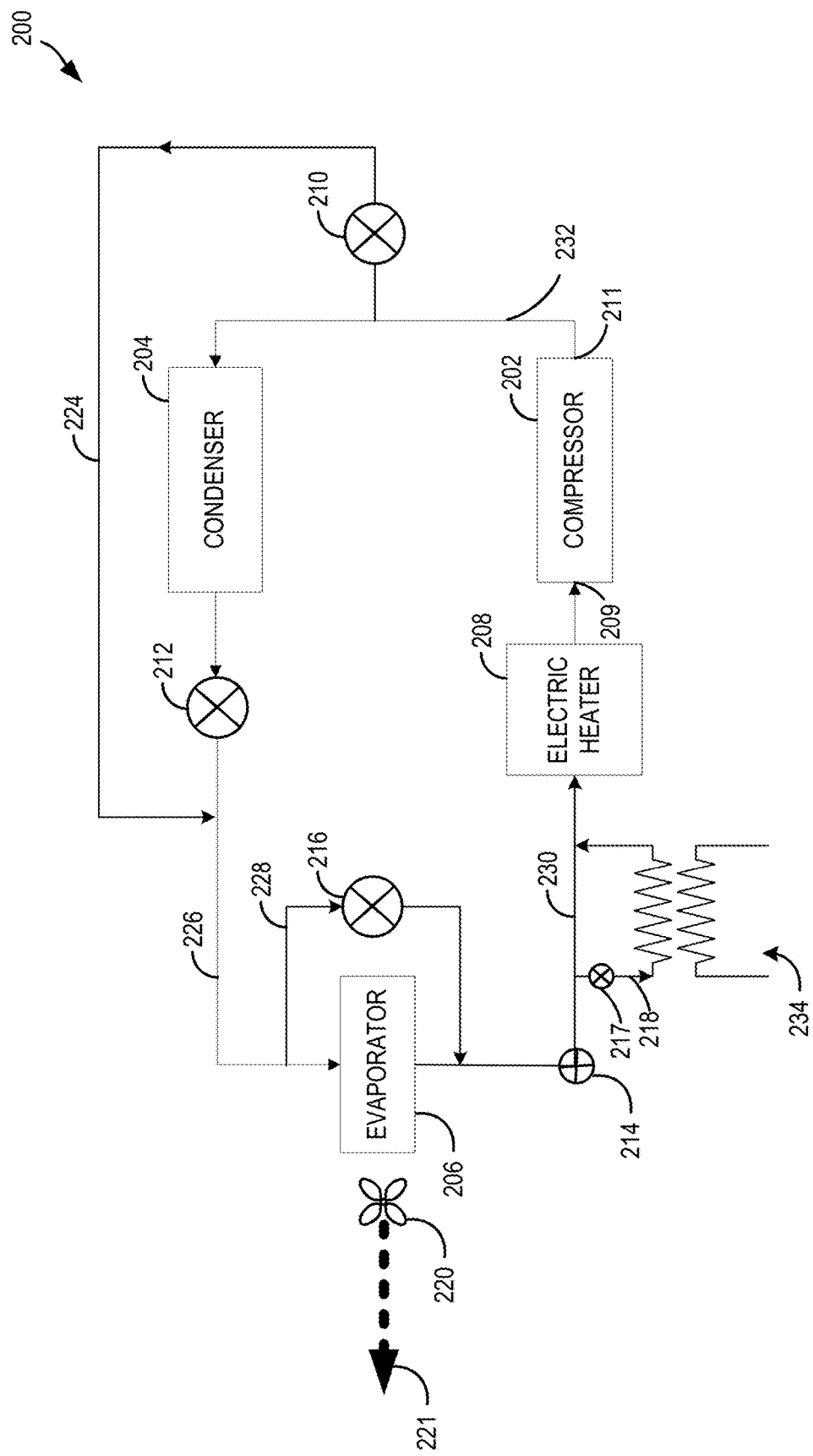
FIG. 2A is a schematic diagram of a vehicle A/C system configured to provide instant heat for a vehicle cabin.
Figure 2B:
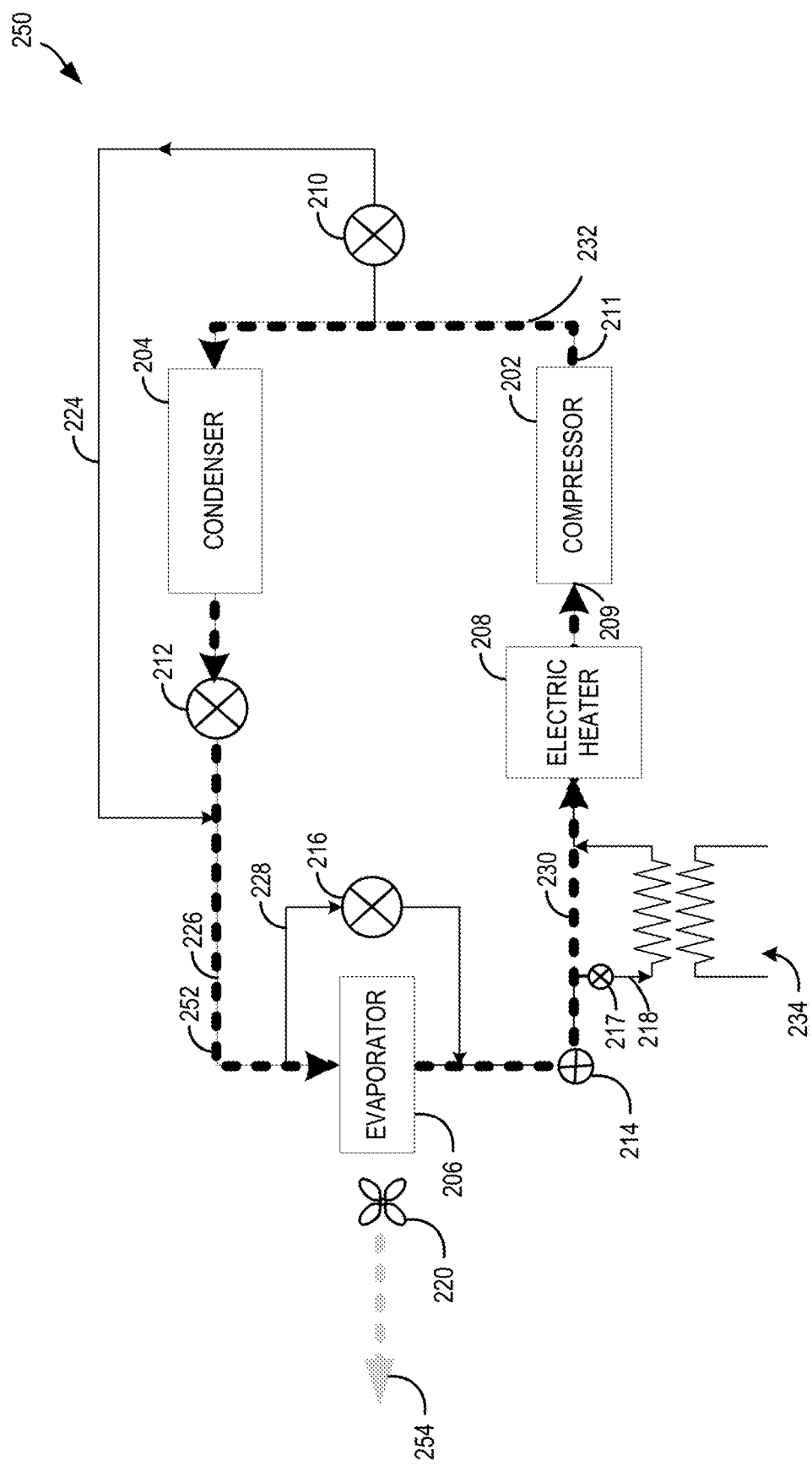
FIG. 2B is a schematic diagram of a vehicle A/C system configured to provide instant heat showing a flow of refrigerant during typical A/C operation.
Figure 2C:
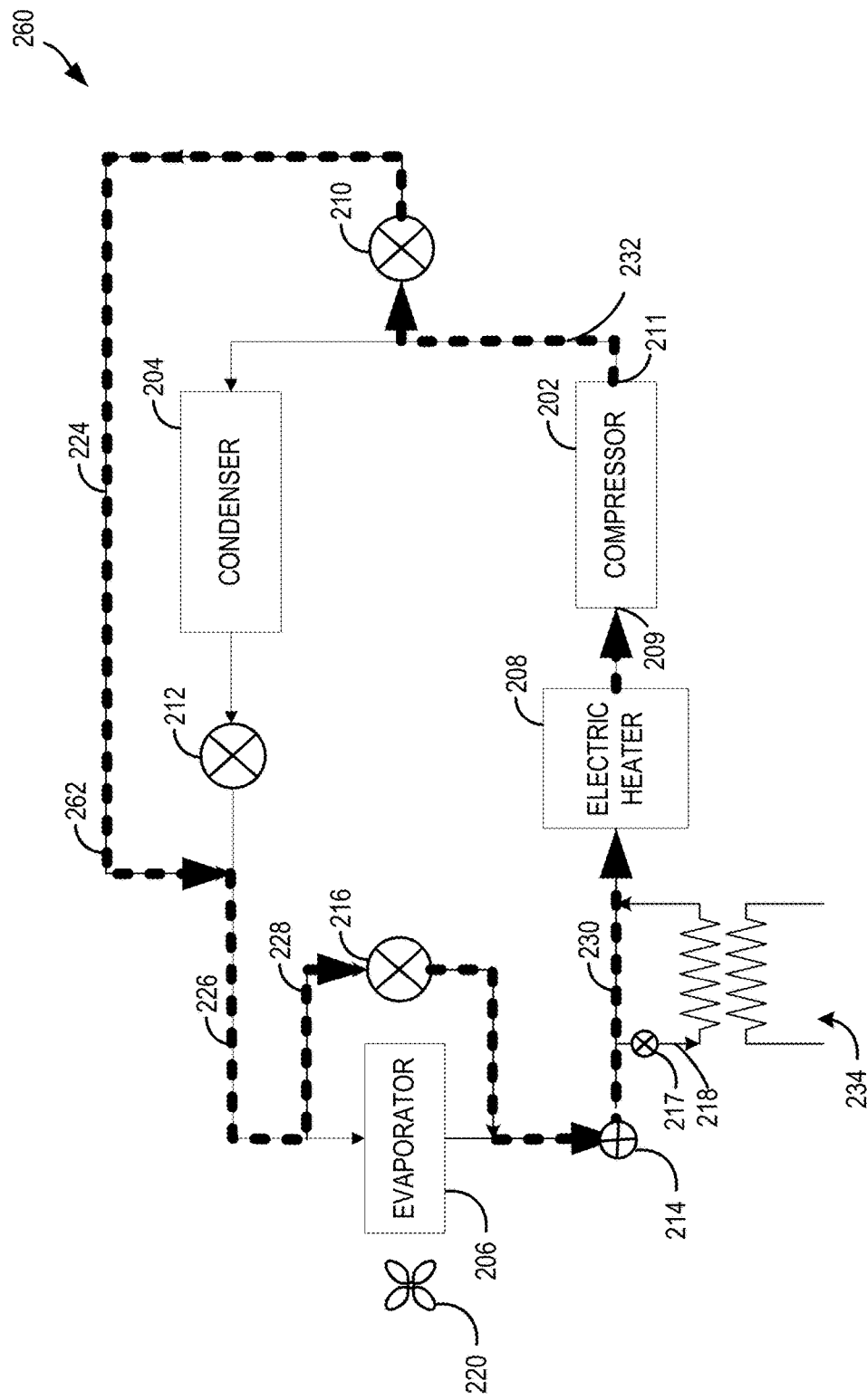
FIG. 2C is a schematic diagram of a vehicle A/C system configured to provide instant heat showing a flow of refrigerant during a first mode of instant heat operation.
Figure 2D:
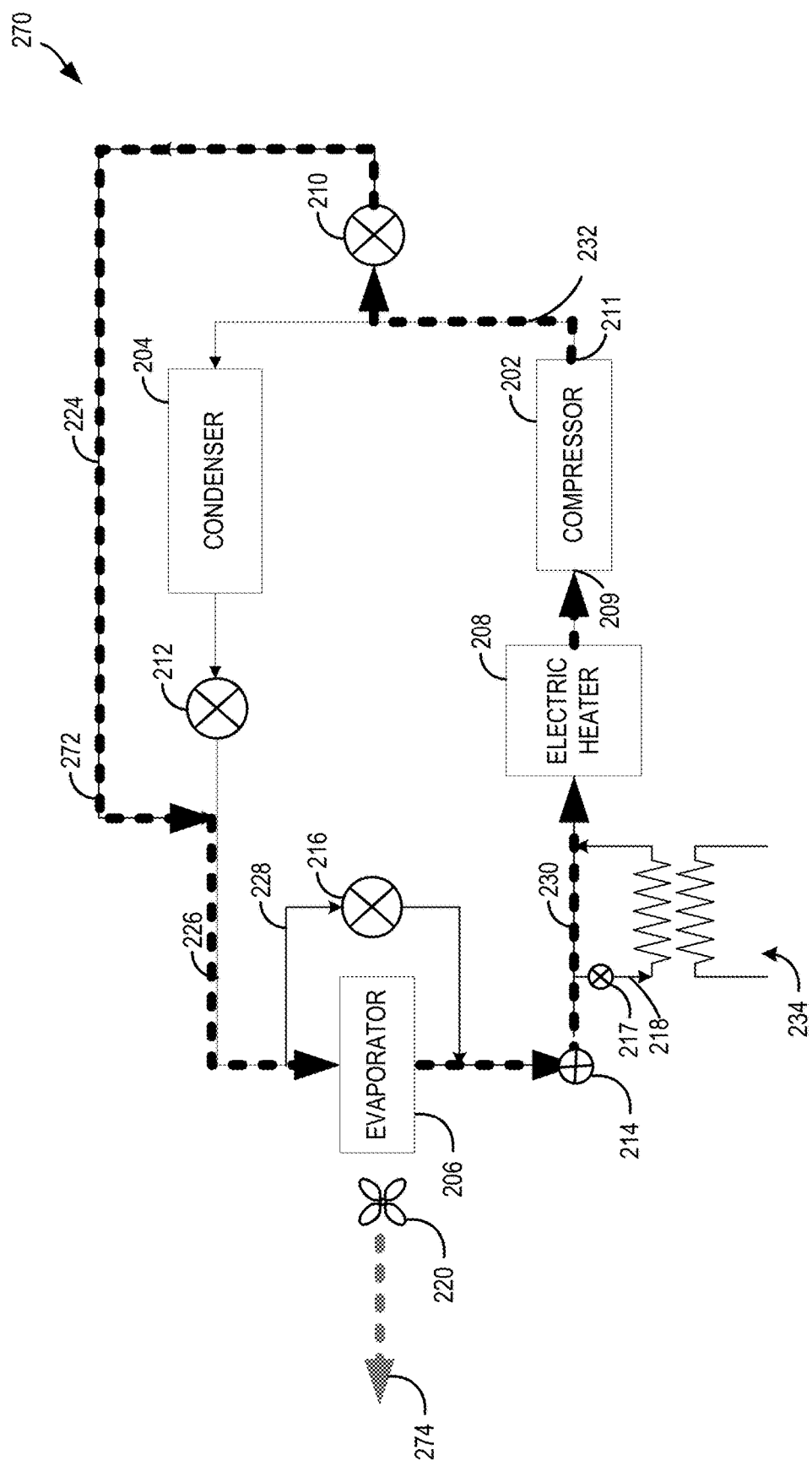
FIG. 2D is a schematic diagram of a vehicle A/C system configured to provide instant heat showing a flow of refrigerant during a second mode of instant heat operation.
Figure 2E:
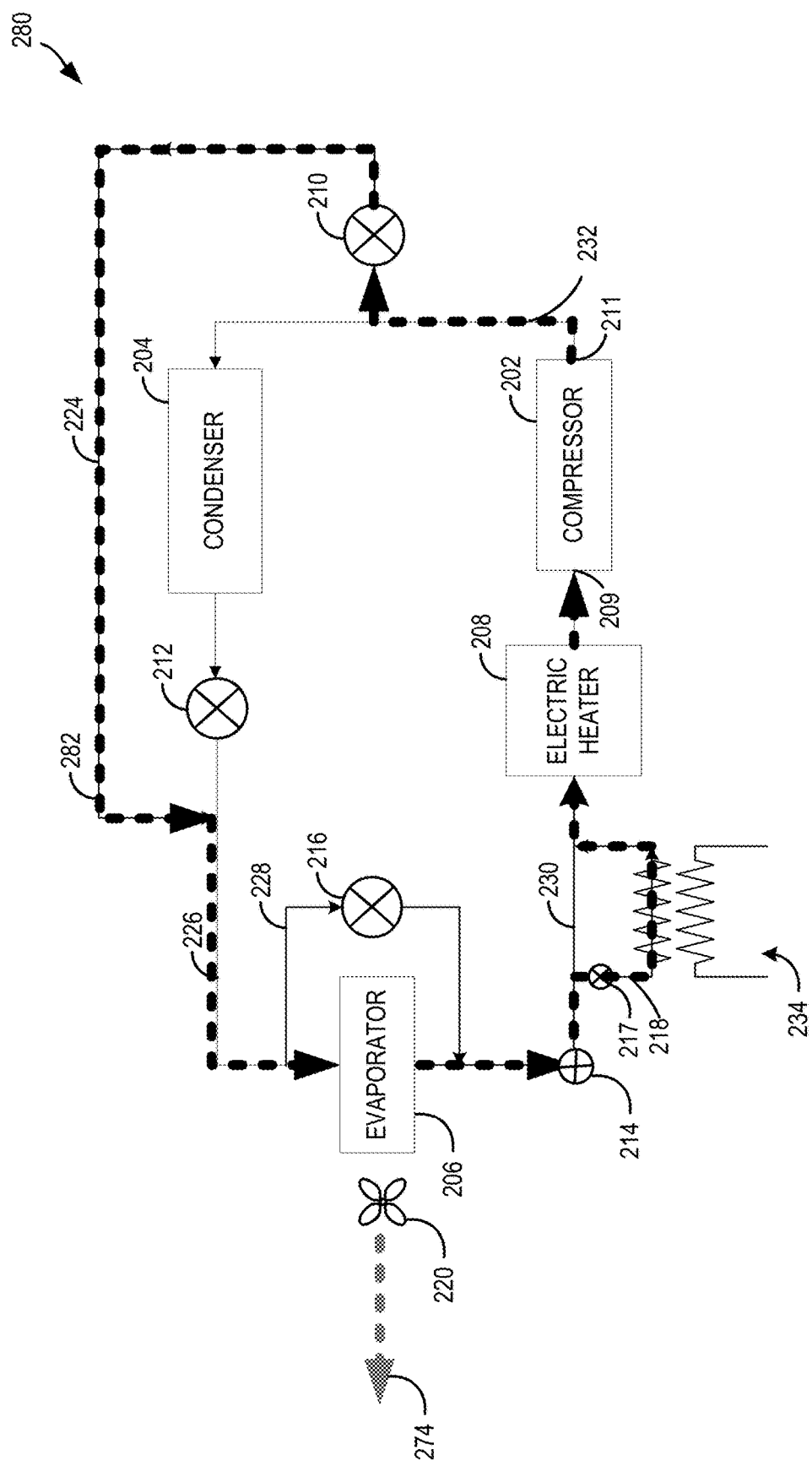
FIG. 2E is a schematic diagram of a vehicle A/C system configured to provide a combination of instant heat and engine waste heat.

In one non-limiting example, an A/C system may be configured as illustrated in FIG. 1. The configuration of the A/C system may be altered to provide instant heat by adding bypass conduits around a condenser of the A/C system and an evaporator of the A/C system, as shown in FIG. 2A. During provision of A/C, a refrigerant of the A/C system may flow through the A/C system as shown by FIG. 2B. During provision of instant heat, the refrigerant may flow through the A/C system in a first mode, as shown by FIG. 2C, or in a second mode, as shown by FIG. 2D. When an engine of the vehicle is hot enough to provide heat via a coolant of the engine, the refrigerant may be additionally routed through a coolant/refrigerant heat exchange loop, as shown by FIG. 2E. Instant heat may be provided to the cabin in accordance with a method such as method 300 of FIG. 3. A flow of the refrigerant through the A/C system to provide instant heat may be controlled in accordance with a method such as method 400 of FIG. 4, including during a first mode in accordance with a method such as method 500 of FIG. 5. A set of operations may be performed to provide the instant heat that are timed in accordance with the timing diagram 500 of FIG. 5.

Referring now to FIG. 1, A/C system 100 includes an evaporator 8 (e.g., a refrigerant-to-air heat exchanger) for cooling vehicle cabin air. Air is passed over evaporator 8 via a fan 50 and directed around a vehicle cabin 2. A climate controller 26 operates fan 50 according to operator settings as well as climate sensors. Temperature sensor 4 provides an indication of the temperature of evaporator 8 to climate controller 26. A cabin temperature sensor 30 provides an indication of cabin temperature to climate controller 26. Similarly, a humidity sensor 32 provides climate controller 26 an indication of cabin humidity. A sun load sensor 34 provides an indication of cabin heating from sunlight to climate controller 26. Climate controller 26 also receives operator inputs from operator interface 28 and supplies desired evaporator temperature and actual evaporator temperature to a vehicle controller 12. Thus, controller 26 receives signals from the various sensors of FIG. 1 and employs the various actuators to adjust A/C system operation based on the received signals and instructions stored on a memory of one or more controllers of the vehicle, including climate controller 26.

Operator interface 28 allows an operator to select a desired cabin temperature, fan speed, and distribution path for conditioned cabin air. Operator interface 28 may include dials, buttons, and/or other controls to select A/C settings. In some examples, operator interface 28 may accept inputs via a touch sensitive display. In some examples, operator interface 28 may allow the A/C settings to be set and/or commands to be executed remotely.

Refrigerant is supplied to evaporator 8 via a thermostatic expansion valve 20 after being pumped into a condenser 16. Compressor 18 receives refrigerant gas from evaporator 8 and pressurizes the refrigerant. Heat is extracted from the pressurized refrigerant as the refrigerant is liquefied at condenser 16. The liquefied refrigerant expands after passing through the thermostatic expansion valve 20, causing a temperature of evaporator 8 to decrease.

Compressor 18 may include a clutch 24, a variable displacement control valve 22, one or more pistons 80 and/or swash plate 82. The one or more pistons 80 pressurize the refrigerant in A/C system, which flows from compressor 18 to condenser 16. Swash plate 82 adjusts the stroke of the one or more pistons 80 to adjust a pressure at which refrigerant is output from compressor 18 based on variable displacement control valve 22. Clutch 24 may be selectively engaged and disengaged to supply air conditioner compressor 18 with rotational energy from an energy conversion device 10. For example, clutch 24 may be an electromagnetic clutch; and clutch 24 may be energized by supplying a voltage to the clutch for engagement. In order to disengage clutch 24, zero voltage may be supplied to the clutch. In one example, energy conversion device 10 is an engine supplying rotational energy to compressor 18 and wheels 60 via transmission 70. In other examples, energy conversion device 10 is an electrical motor supplying rotational energy to compressor 18 and wheels 60 via transmission 70. Rotational energy may be supplied to compressor 18 from energy conversion device 10 via a belt 42. In one example, belt 42 mechanically couples shaft 40 to compressor 18 via clutch 24. Shaft 40 may be an engine crankshaft, armature shaft, or other shaft.

An inlet pressure sensor 81 may be positioned at an inlet of compressor 18, such that a sensing element is exposed to a pressure of the refrigerant as the refrigerant enters the compressor 18, and an outlet pressure sensor 79 may be positioned at an outlet of compressor 18, such that a sensing element is exposed to a pressure of the refrigerant as the refrigerant exits the compressor 18. Outputs of inlet pressure sensor 81 and outlet pressure sensor 79 during one or more compressor cylinder cycles may be utilized for determining one or more compressor operating parameters, including a compressor inlet pressure, a compressor outlet pressure, and a compressor speed. In one non-limiting embodiment, the inlet pressure sensor 81 and/or outlet pressure sensor 79 may be replaced by an inlet temperature sensor 81 and/or an outlet temperature sensor 79. It should be appreciated that because the A/C system 100 is sealed, the pressure of the refrigerant at a location in the A/C system is directly and proportionally related to a temperature of the refrigerant at the location, whereby outputs of temperature sensors 81 and/or 79 may also be utilized interchangeably with the pressure sensors 81 and/or 79 for determining the one or more compressor operating parameters. Therefore, for the purposes of this disclosure, references to temperature sensors 81 and/or 79 may be substituted by references to pressure sensors 81 and/or 79, and vice-versa.

The vehicle controller 12 and/or climate controller 26 receive signals from the various sensors of FIG. 1 and employ the various actuators of FIG. 1 to adjust system operation based on the received signals and instructions stored on a memory of the vehicle controller 12 and/or climate controller 26. In one example, the vehicle controller 12 and/or the climate controller 26 may receive signals from inlet pressure sensor 81 and/or outlet pressure sensor 79 and may employ various actuators to adjust control of one or more components of A/C system, including clutch 24, the fan 50, and/or other elements of the A/C system based on the received signals. It will be appreciated that in some examples, inlet pressure sensor 81 and/or outlet pressure sensor 79 may provide pressure indications to the vehicle controller 12. In yet other examples, the inlet pressure sensor 81 and/or the outlet pressure sensor 79 may provide pressure indications to climate controller 26, which in turn may communicate the pressure indications to the vehicle controller 12. The climate controller 26 and/or the vehicle controller 12 may adjust control of one or more components of A/C system based on the pressure indications from inlet pressure sensor 81 and/or outlet pressure sensor 79. For example, in response to a pressure of the refrigerant reaching a threshold pressure at the outlet of the compressor, as measured via the outlet pressure sensor 79, the controller 12 may transition from a first mode of operation of the A/C system 200 to a second mode of the A/C system 200, as described above and in greater detail below.

Referring now to FIG. 2A, an A/C system 200 of a vehicle is shown in an alternative configuration that allows for providing instant heat to a cabin of the vehicle upon request, in addition to providing air conditioning to the cabin upon request. A/C system 200 includes a compressor 202, a condenser 204, and an evaporator 206, which may be non-limiting examples of the compressor 18, condenser 16, and evaporator 8 of A/C system 100 of FIG. 1. The compressor 202 may be fluidically coupled to the condenser 204 via a conduit 232; the condenser 204 may be fluidically coupled to the evaporator 206 via a conduit 226; and the evaporator 206 may be fluidically coupled to the compressor 202 via a conduit 230. A/C system 200 may also include a throttle 212 arranged on the conduit 226. In one example, the throttle 212 is a thermostatic expansion device, such as the thermostatic expansion valve 20 of FIG. 1. A refrigerant of the A/C system in a gaseous form may be compressed by the compressor 202, which may cause the refrigerant to flow in an A/C circuit between the compressor 202, the condenser 204, and the evaporator 206 via the conduits 226, 230, and 232. In a typical A/C operation, refrigerant is compressed by the compressor 202, increasing a pressure and a temperature of the refrigerant at a compressor outlet 211. The compressed refrigerant flows into the condenser 204, where the refrigerant is condensed into a liquid form, releasing heat from the refrigerant (e.g., into the environment). As a flow of refrigerant flows through the throttle 212, the refrigerant undergoes a phase change back into a gaseous state and expands into the evaporator 206. The throttle 212 may control an amount of the refrigerant injected into the evaporator 206 based on the temperature and/or pressure of the refrigerant. For example, the throttle 212 may be actuated to increase the amount of the refrigerant injected into the evaporator 206 (e.g., to speed up a flow of the refrigerant), or the throttle 212 may be actuated to decrease the amount of the refrigerant injected into the evaporator 206 (e.g., to slow down a flow of the refrigerant). As the refrigerant expands in the evaporator, the refrigerant absorbs heat from air passing across the evaporator (e.g., from an air passage leading to the cabin). A blower 220 (e.g., the fan 50 of A/C system 100 of FIG. 1) may direct the heated air to the cabin as indicated by the black directional arrow 221, and an amount of heat absorbed from the air may be controlled by the blower 220. For example, when the blower 220 is at a low setting, air may be directed across the evaporator 206 at a first speed, and a first amount of heat may be absorbed from the air by the evaporator 206. At a high setting of the blower 220, air may be directed across the evaporator 206 at a second, faster speed, and a second amount of heat may be absorbed from the air by the evaporator 206, where the second amount of heat is greater than the first amount of heat. The refrigerant then flows back to the compressor 202 to complete the A/C circuit. In this way, during typical A/C operation, heat may be extracted from an internal environment of the vehicle and released into an external environment of the vehicle, thereby cooling the cabin.

In some examples, an auxiliary throttle 214 may be included on conduit 230 between the evaporator 206 and the electric heater 208, which may be actuated to increase or decrease a flow of refrigerant through the A/C circuit.

Turning briefly to FIG. 2B, a flow diagram 250 shows a flow of refrigerant through the A/C system 200 of FIG. 2A during typical A/C operation. The flow of refrigerant is indicated by a black directional arrow 252, which results in a flow of cool air into the cabin indicated by the gray directional arrow 254 as a result of operation of the blower 220. As described above, the refrigerant circulates in a circuit between the compressor 202, the condenser 204, and the evaporator 206, where air blown into the cabin is cooled.

Returning to FIG. 2A, the A/C system 200 may include an electric heater 208 arranged on the conduit 230 (e.g., that couples the evaporator 206 to the compressor 202), which may be positioned proximate to a compressor inlet 209 of the compressor 202. The electric heater may be powered by an energy generating device of the vehicle, such as an alternator, a front-end accessory device such as a belt-integrated starter-generator (BISG), or another generator. In other examples, the electric heater may be powered by a battery of the vehicle, or the electric heater may be powered by an external energy source (e.g., a wired connection to an electric grid via an external outlet). In one example, the electric heater provides resistance heat by energizing a coil of a conductive material that wraps around the conduit 230. When the electric heater is powered on, electricity passing through the conductive material may increase a temperature of the coil, whereby heat radiating from the coil may be absorbed by the refrigerant flowing through the conduit 230, thereby raising a temperature of the refrigerant.

The electric heater 208 may heat a flow of refrigerant through the A/C system 200 to increase the temperature and pressure of the refrigerant prior to the refrigerant entering the compressor 202 at the compressor inlet 209. Since an efficacy of the compressor 202 may depend on a density of the refrigerant in the compressor 202, increasing the temperature and pressure of the refrigerant at the compressor inlet 209 may increase the efficacy of the compressor 202. When the compressor 202 is operating at maximum, an amount of heat generated by the A/C system may be maximized. In one example, the compressor 202 is operating at maximum efficacy when a pressure of the refrigerant at the compressor outlet 211 reaches a threshold pressure (e.g., 350 psig), whereby if the pressure of the refrigerant at the compressor outlet 211 is above the threshold pressure, excess heat is being produced by the A/C system that may be used to heat the vehicle cabin, and if the pressure of the refrigerant is not above the threshold pressure, sufficient heat is not being produced by the A/C system to heat the vehicle cabin.

A refrigerant/coolant heat exchanger 234 may be arranged on a waste heat exchange loop 218, which provides an alternative path for the flow of refrigerant from the evaporator 206 to the electric heater 208 via the refrigerant/coolant heat exchanger 234. In one example, the waste heat exchange loop 218 is fluidically coupled to the conduit 230 upstream of the electric heater 208, where the flow of refrigerant through the refrigerant/coolant heat exchanger 234 is controlled via a heat exchange loop valve 217 actuated by the controller. If the heat exchange loop valve 217 is actuated open, the refrigerant flows through the refrigerant/coolant heat exchanger 234. If the heat exchange loop valve 217 is actuated closed, no refrigerant flows through the refrigerant/coolant heat exchanger 234, and the refrigerant flows from the evaporator 206 to the electric heater 208 via the conduit 230.

In one example, the refrigerant/coolant heat exchanger 234 may be used to heat the refrigerant prior to the refrigerant entering the electric heater 208, thereby further increasing the temperature of the refrigerant prior to the refrigerant entering the compressor 202 at the compressor inlet 209. For example, prior to the engine warming up, a coolant of the engine may have a temperature that is less than the temperature of the refrigerant. In response to the temperature of the coolant being less than the temperature of the refrigerant, the heat exchange loop valve 217 may be actuated closed, so that no refrigerant flows through the refrigerant/coolant heat exchanger 234 and the refrigerant flows from the evaporator 206 to the electric heater 208 via the conduit 230. After the engine warms up, the temperature of the coolant may exceed the temperature of the refrigerant. In response to the temperature of the coolant being greater than the temperature of the refrigerant, the heat exchange loop valve 217 may be actuated open, so that the refrigerant flows from the evaporator through the refrigerant/coolant heat exchanger 234 prior to entering the electric heater 208 and the compressor 202. As the refrigerant flows from the evaporator through the refrigerant/coolant heat exchanger 234, heat from the coolant is transferred to the refrigerant. In this way, waste heat from the engine may be used to further increase the temperature of the refrigerant at the compressor inlet 209, thereby increasing an efficacy of the compressor 202 and reducing a time until sufficient heat may generated to heat air to transfer to the cabin.

In another example, the refrigerant/coolant heat exchanger 234 may be positioned within the electric heater 208 (e.g., where one or more coils of the electric heater wrap around and/or are collocated with one or more coils of the refrigerant/coolant heat exchanger 234), whereby the electric heater may heat either or both of the refrigerant and the coolant. For example, the electric heater 208 may be used to heat the refrigerant to provide instant heat to the cabin, while concurrently heating the coolant to decrease a time taken to warm up the engine (e.g., at which point engine waste heat may be provided to the cabin more efficiently than instant heat). In other words, there may be a temperature range of the coolant within which the temperature of the coolant is higher than the temperature of the refrigerant, while the heater core is not yet hot enough to provide heat to the cabin The A/C system 200 may include a condenser bypass conduit 224 that allows the refrigerant to flow from the compressor 202 to the evaporator 206, bypassing the condenser 204. The A/C system 200 may include a condenser bypass valve 210 arranged on the condenser bypass circuit 224, which may be actuated by the controller to either route the refrigerant to the condenser 204 or around the condenser 204 via the condenser bypass circuit 224. In one example, if the condenser bypass valve 210 is actuated open, the refrigerant bypasses the condenser 204 via the condenser bypass conduit 224, and if the condenser bypass valve 210 is actuated closed, the refrigerant is routed to the condenser 204 and does not bypass the condenser 204 via the condenser bypass conduit 224. The condenser bypass valve 210 may be actuated open in response to a request for instant heat, whereby hot refrigerant exiting the compressor 202 at the compressor outlet 211 is not condensed at the condenser 204, but routed to the evaporator 206 where heat from the refrigerant may be transferred to air and used to heat the cabin. As a result of the refrigerant not passing through the condenser 204 and undergoing a phase change (e.g., into liquid form), the conduit 224 may also bypass the throttle 212.

In FIG. 2A, the condenser bypass valve 210 is depicted as a two-way valve arranged on conduit 224 that may be actuated open or closed to allow the refrigerant to pass through the condenser bypass valve 210 in a first direction or in a second, reverse direction, where if the condenser bypass valve 210 is closed, all the refrigerant is routed to the condenser 204, while if the condenser bypass valve 210 is open, a first portion of the refrigerant is routed to the condenser 204 and a second portion of the refrigerant is routed around the condenser 204 via the conduit 224. As a result of the condenser 204 being a high restriction path and the conduit 224 being a low restriction path, the second portion of the refrigerant may be significantly greater than the first portion, whereby most of the refrigerant is routed around the condenser 204 via the conduit 224. In another example, the condenser bypass valve 210 is a three-way valve arranged at an intersection of conduit 224 and conduit 232, where the condenser bypass valve 210 may be actuated in a first configuration to allow the flow of refrigerant to be entirely routed to the condenser 204, or in a second configuration to allow the flow of refrigerant to be entirely routed around the condenser 204 via the conduit 224, or actuated in one or more additional configurations to allow the flow of refrigerant to be partially routed to the condenser 204 and partially routed around the condenser 204 via the conduit 224. In still other examples, the condenser bypass valve 210 is a two-way valve and a second two-way valve is arranged on conduit 232 between the condenser 204 and the intersection of conduit 224 and conduit 232, such that by actuating the condenser bypass valve 210 open and actuating the second two-way valve closed the refrigerant is routed around the condenser 204, and by actuating the condenser bypass valve 210 closed and actuating the second two-way valve open the refrigerant is routed to the condenser 204.

The A/C system 200 may include an evaporator bypass conduit 228 that allows the refrigerant to bypass the evaporator 206, passing from the conduit 226 to the conduit 230 without entering the evaporator 206. The A/C system 200 may include a two-way evaporator bypass valve 216 arranged on the evaporator bypass circuit 228, which may be actuated by the controller to either route the refrigerant to the evaporator 206 or around the evaporator 206 via the evaporator bypass circuit 228. For example, if the evaporator bypass valve 216 is actuated open, some or most of the refrigerant bypasses the evaporator 206 via the evaporator bypass conduit 228. If the evaporator bypass valve 216 is actuated closed, the refrigerant is routed to the evaporator 206 and does not bypass the evaporator 206 via the evaporator bypass conduit 228. In other examples, the evaporator bypass valve 216 may be a three-way valve positioned at an intersection of conduit 228 and conduit 226, or the evaporator bypass valve 216 may be a two-way valve and an additional two-way valve may be arranged on the conduit 226 between the evaporator 206 and the intersection of conduit 228 and conduit 226, where an operation of the three-way valve or an operation of the evaporator bypass valve 216 in conjunction with the additional two-way valve is similar to that which is describe above in relation to the condenser bypass valve 210.

In one example, the evaporator bypass valve 216 is actuated open during a first mode of operation of instant heat, in response to a request for in-cabin heat before engine waste heat is available to heat the cabin, whereby the hot refrigerant exiting the compressor 202 at the compressor outlet 211 is routed around both the condenser 204 (e.g., via the condenser bypass circuit 224) and the evaporator 206. By routing the refrigerant around the evaporator 206, heat from the refrigerant is not transferred to air circulating around the evaporator 206 and blown into the cabin by the blower 220, but is retained in the refrigerant to increase the temperature of the refrigerant at the compressor inlet 209. By increasing the temperature of the refrigerant at the compressor inlet 209, an efficacy of the compressor 202 may be increased, thereby increasing a heat generation of the A/C system as a whole.

Turning now to FIG. 2C, a flow diagram 260 shows a flow of refrigerant through the A/C system 200 of FIG. 2A during a first mode of instant heat generation. In the first mode of instant heat generation, heat generated by the compressor 202 may be retained within the A/C system 200 and not provided to the cabin via the evaporator 206, to increase the efficacy of the compressor 202 and increase the temperature of the refrigerant until a threshold temperature is achieved (e.g., a temperature at which heat may be provided to the cabin via the evaporator 206 without reducing the efficacy of the compressor 202). The flow of refrigerant in the first mode is indicated by a black directional arrow 262. The condenser bypass valve 210 has been actuated to an open position, whereby the flow of refrigerant is routed around the condenser 204, and the evaporator bypass valve 216 has been actuated to an open position, whereby the flow of refrigerant is routed around the evaporator 206. The flow of refrigerant may be further heated by the electric heater 208, to increase the temperature/pressure of the refrigerant at the compressor inlet 209.

Referring now to FIG. 2D, a flow diagram 270 shows a flow of refrigerant through the A/C system 200 of FIG. 2A during a second mode of instant heat generation. In one example, heat is built up within the A/C system 200 during the first mode of instant heat generation (e.g., to maximize the efficacy of the compressor 202 and minimize a time taken to reach the threshold temperature), and in the second mode of instant heat generation, the heat built up within the A/C system 200 is transferred to air that is blown into the cabin (e.g., by the blower 220) in accordance with a control routine. The control routine may adjust a blower speed of the blower 220 and/or other parameters and/or components of the A/C system to maintain a temperature of the refrigerant at the threshold temperature, and divert excess heat generated by the A/C system to the air (e.g., to heat the cabin). In this way, the compressor 202 is maintained at maximum efficacy and an overall amount of heat generated by the A/C system is maximized.

In the second mode of instant heat generation, heat generated by the compressor 202 is transferred to air blown by the blower 220 across the evaporator 206 and into the cabin to provide instant heat to the driver, as indicated by directional arrow 274. The flow of refrigerant in the second mode is indicated by a black directional arrow 272. The condenser bypass valve 210 has been actuated to an open position, whereby the flow of refrigerant is routed around the condenser 204, and the evaporator bypass valve 216 has been actuated to a closed position, whereby the flow of refrigerant is routed to the evaporator 206. In one example, the evaporator bypass valve 216 is actuated closed in response to the temperature of the refrigerant at the compressor inlet 209 reaching the threshold temperature. In one example, the evaporator bypass valve 216 is actuated closed in response to a pressure of the refrigerant at the compressor outlet 211 reaching a threshold pressure (e.g., 350 psig). In yet another example, the evaporator bypass valve 216 is actuated closed after a threshold duration Referring now to FIG. 2E, a flow diagram 280 shows a flow of refrigerant through the A/C system 200 of FIG. 2A during a late stage of the second mode of instant heat generation, when the engine has heated the coolant to a temperature that is greater than the temperature of the refrigerant, where heat in the coolant may be transferred to the refrigerant to facilitate instant heat generation. The flow of refrigerant in the late stage of the second mode is indicated by a black directional arrow 282. As described above in reference to FIG. 2D, heat generated by the compressor 202 is transferred to air blown by the blower 220 across the evaporator 206 and into the cabin to provide instant heat to the driver, as indicated by directional arrow 274. However, in FIG. 2E, the heat exchange loop valve 217 is actuated open, whereby the refrigerant flows through conduit 218 and the refrigerant/coolant heat exchanger 234 prior to entering the compressor 202. As cool refrigerant exiting the evaporator 206 and is routed through the refrigerant/coolant heat exchanger 234, heat from the coolant is transferred to the refrigerant, increasing the temperature of the refrigerant. As a result of the increased temperature of the refrigerant at the compressor inlet 209, more heat is generated by the compressor 202, which may be subsequently released at the evaporator 206 to provide an increased amount of heat to the cabin.

Although the refrigerant/coolant heat exchanger 234 is depicted in FIG. 2E as positioned upstream of the electric heater 208, in other examples, the refrigerant/coolant heat exchanger 234 may be positioned downstream of the electric heater 208, or within the electric heater 208 as described above. As described above in relation to the condenser bypass valve 210 and the evaporator bypass valve 216, the heat exchange loop valve 217 may be a two-way valve or a three-way valve, or the heat exchange loop valve 217 may be one of two two-way valves used to control the flow of refrigerant to the compressor 202 either via the conduit 230 or via the conduit 218 and the refrigerant/coolant heat exchanger 234.

Figure 3:
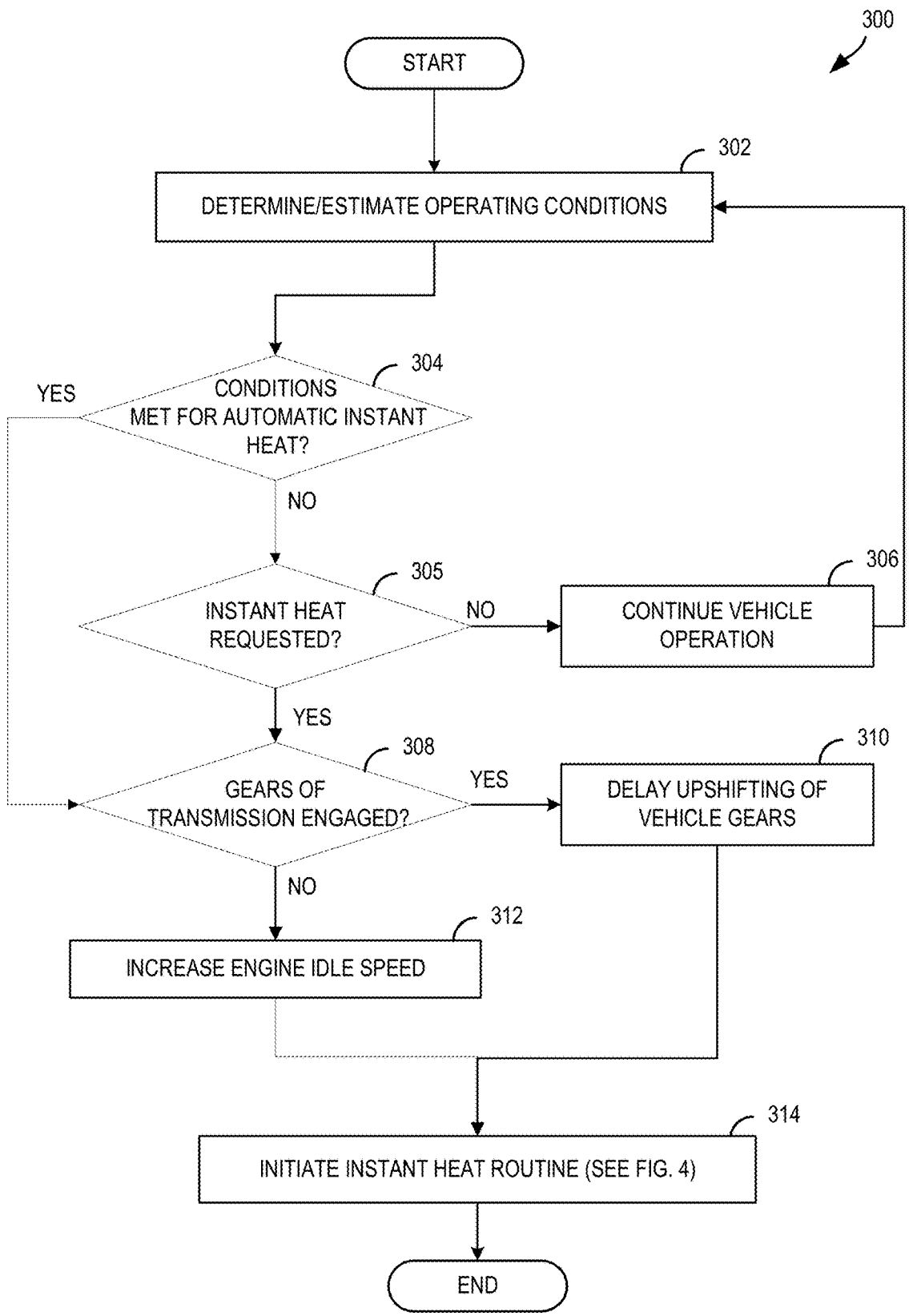
FIG. 3 is a flowchart showing an example method for initiating instant heat to a cabin of a vehicle.

FIG. 3 is a flowchart showing an example method 300 for providing instant heat to a cabin of a vehicle via an A/C system, such as the A/C system 100 of FIG. 1 and/or the A/C system 200 of FIGS. 2A-2E. Instructions for carrying out method 300 and the rest of the methods included herein may be executed by a controller (e.g., the controller 12 and/or the climate controller 26 of FIG. 1) based on instructions stored on a memory of the controller and in conjunction with signals received from sensors of an engine system of the vehicle, such as the sensors described above with reference to FIG. 1. The controller may employ engine actuators of the engine system to adjust operation of an engine of the vehicle, according to the methods described below. For example, the controller may measure a temperature/pressure of a refrigerant circulating throughout the A/C system via a temperature/pressure sensor positioned at an input of a compressor of the A/C system (e.g., the temperature/pressure sensor 81 of FIG. 1), and in response to the measured temperature/pressure, the controller may employ an actuator to adjust a speed of a blower of the A/C system (e.g., the blower 220 of FIGS. 2A-2E) to increase or decrease the measured temperature and/or pressure.

At 302, method 300 includes estimating and/or measuring vehicle operating conditions. For example, the vehicle operating conditions may include, but are not limited to, a status of an engine of the vehicle (e.g., whether the engine is switched on), and an engagement of one or more gears of a transmission of the vehicle (e.g., whether the vehicle is moving). The vehicle operating conditions may include a temperature of the engine, a temperature of an environment of the vehicle, and a temperature of a cabin of the vehicle, which may be estimated based on one or more outputs of various sensors of the vehicle, such as the sensors described above with reference to FIG. 1. Vehicle operating conditions may include engine speed and load, vehicle speed, transmission oil temperature, exhaust gas flow rate, mass air flow rate, coolant temperature, coolant flow rate, engine oil pressures (e.g., oil gallery pressures), operating modes of one or more intake valves and/or exhaust valves, electric motor speed, battery charge, engine torque output, vehicle wheel torque, etc. In one example, the vehicle is a hybrid electric vehicle, and estimating and/or measuring vehicle operating conditions includes determining whether the vehicle is being powered by an engine or an electric motor. Estimating and/or measuring vehicle operating conditions may further include determining a state of a fuel system of the vehicle, such as a level of fuel in the fuel tank, determining a state of one or more valves of the fuel system, etc.)

At 304, method 300 includes determining whether conditions are met for automatically turning on instant heat. In one example, the conditions for automatically turning on instant heat include a combination of the vehicle being started remotely and a temperature of the cabin being below a threshold temperature (e.g., a remote start in cold conditions). For example, in cold weather, the driver may wish to warm up the cabin prior to entering the vehicle, and may initiate a remote start via a key fob of the vehicle. Upon starting the vehicle, the controller may estimate a temperature of the cabin from an in-cabin temperature sensor, and if the temperature of the cabin is below the threshold temperature (e.g., room temperature, 65°, etc.) the controller may automatically turn on instant heat.

If at 304 it is determined that conditions are met for automatic instant heat, method 300 proceeds to 308, which is described in detail below. If at 304 it is determined that conditions are not met for automatic instant heat, method 300 proceeds to 305. At 305, method 300 includes determining whether instant heat has been requested by the driver or a user of the vehicle. For example, the driver may select a control on a dashboard of the vehicle to initiate a request for instant heat, or the driver may issue a verbal command requesting instant heat to a virtual assistant of the vehicle via a microphone installed in the cabin, or the driver may initiate a request for instant heat in another manner. If at 305 it is determined that the driver or the user of the vehicle has not requested instant heat, method 300 proceeds to 306. At 306, method 300 includes continuing vehicle operation, and method 300 proceeds back to 302. Continuing vehicle operation at 306 includes, but is not limited to, maintaining a status of the engine and/or the one or more gears of the transmission. For example, if the engine is on and no gears of the vehicle are engaged, continuing vehicle operation includes maintaining the engine on with no gears of the transmission engaged. If the engine is on and one or more gears of the transmission are engaged (e.g., the vehicle is being driven), continuing vehicle operation includes maintaining the engine on and maintaining the one or more gears of the transmission in an engaged state.

If at 305 it is determined that the driver or the user of the vehicle has requested instant heat, method 300 proceeds to 308. At 308, method 300 includes determining whether one or more gears of a transmission of the vehicle are engaged. If at 308 is determined that one or more gears of a transmission of the vehicle are engaged, method 300 proceeds to 310. At 310, method 300 includes delaying a shifting of the one or more gears of the transmission into a configuration with a higher gear ratio.

For example, the driver may turn the engine on and engage a first gear of the transmission to start driving the vehicle. In a first condition in which the driver does not request instant heat, as the vehicle accelerates, in response to a speed of the engine reaching a first threshold speed, the controller may shift from the first gear of the transmission into a second gear of the transmission (e.g., the transmission being an automatic transmission), where the second gear of the transmission has a higher gear ratio than the first gear of the transmission. In a second condition in which the driver requests instant heat, as the vehicle accelerates, in response to the speed of the engine reaching the first threshold speed, the controller may not shift from the first gear of the transmission into the second gear of the transmission. In response to the speed of the engine reaching a second threshold speed, the second threshold speed greater than the first threshold speed, the controller may shift from the first gear of the transmission into the second gear of the transmission. In this way, in response to the driver requesting instant heat, the shifting of the vehicle from the first gear into the second gear may be delayed (e.g., conditioned upon a higher engine speed). As a result of the shifting of the vehicle from the first gear into the second gear being delayed, the engine may be operated at a higher speed in the second condition than in the first condition. As a result of the engine being operated at a higher speed, a temperature of the engine and a corresponding temperature of a coolant of the engine may be increased. By increasing the temperature of the coolant, a time taken for in-cabin heat to be generated via engine waste heat may be reduced. For example, a temperature of a coolant-air heat exchanger (e.g., a heater core) of the vehicle may increase to a threshold temperature faster, where the threshold temperature is a temperature greater than the cabin temperature (e.g., a temperature at which heat may be supplied to the cabin via the heater core). By achieving the threshold temperature faster, a waiting time of the driver for in-cabin heat via engine waste heat may be reduced, and therefore a time of instant heat generation (e.g., heat generated via a compressor of the A/C system) may be reduced, resulting in an increased fuel efficiency of the vehicle. In some examples, in addition to delaying upshifting, an engine spark of the engine may be advanced or delayed to increase a fuel flow rate, which may also shorten a time to waste heat availability. Method 300 proceeds to 314.

If at 308 is determined that one or more gears of a transmission of the vehicle are not engaged, method 300 proceeds to 312. At 312, method 300 includes increasing an engine idle speed of the vehicle to a target engine idle speed (e.g., 1800 RPM for an occupied vehicle, 2400 RPM for an unoccupied vehicle). Increasing the idle speed of the vehicle may increase the temperature of the engine and the corresponding temperature of a coolant of the engine, with the results described above at 310.

At 314, method 300 includes initiating an instant heat routine to generate a flow of hot air into the cabin prior to the temperature of the coolant reaching the threshold temperature, at which point in-cabin heating may be provided by engine waste heat via the coolant. The instant heat routine is described below in reference to FIG. 4. Method 300 ends.

Figure 4:
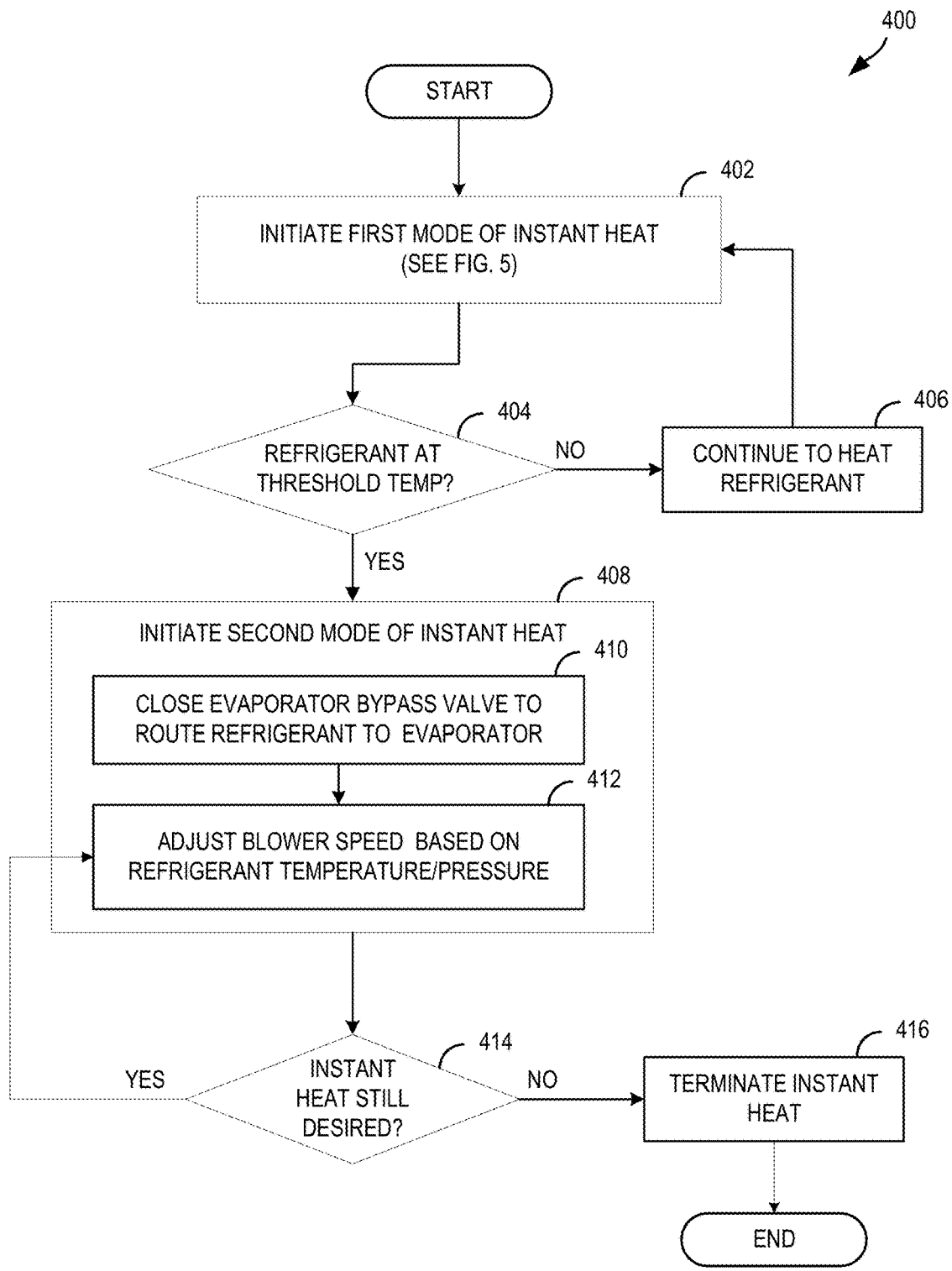
FIG. 4 is a flowchart showing an example method for adjusting a flow of refrigerant in an A/C system to provide instant heat to a cabin of a vehicle.

FIG. 4 is a flowchart showing an example method 400 for adjusting a flow of refrigerant in an A/C system, such as the A/C system 100 of FIG. 1 and/or the A/C system 200 of FIGS. 2A-2E, to provide instant heat to a cabin of a vehicle. The A/C system may include a compressor, a condenser, and an evaporator, such as the compressor 202, the condenser 204, and the evaporator 206 of the A/C system 200 of FIGS. 2A-2E. In one example, method 400 is carried out as part of method 300 described above.

At 402, method 400 includes initiating a first mode of instant heat. During the first mode of instant heat, a transfer of heat from the A/C system to air (e.g., to be blown into the cabin) is delayed (as described in greater detail below) until a temperature of a refrigerant circulating throughout the A/C system reaches a threshold temperature at which the compressor is generating heat at a maximum rate. For example, the threshold temperature may be a temperature at or near a boiling point of the refrigerant, where the refrigerant is in or close to a fully gaseous state, and a density of the refrigerant at the compressor is maximized. By suppressing the transfer of heat to the cabin during the first mode, a time taken to heat up the A/C system is minimized. By waiting to deliver transfer heat from the A/C system to air used to heat the cabin until the threshold temperature is achieved (e.g., in a second mode of instant heat), a performance of the A/C system to deliver heat is increased, where the performance of the A/C system is based on an amount of heat generated by the A/C system and a time taken to deliver a flow of hot air to the cabin.

Figure 5:
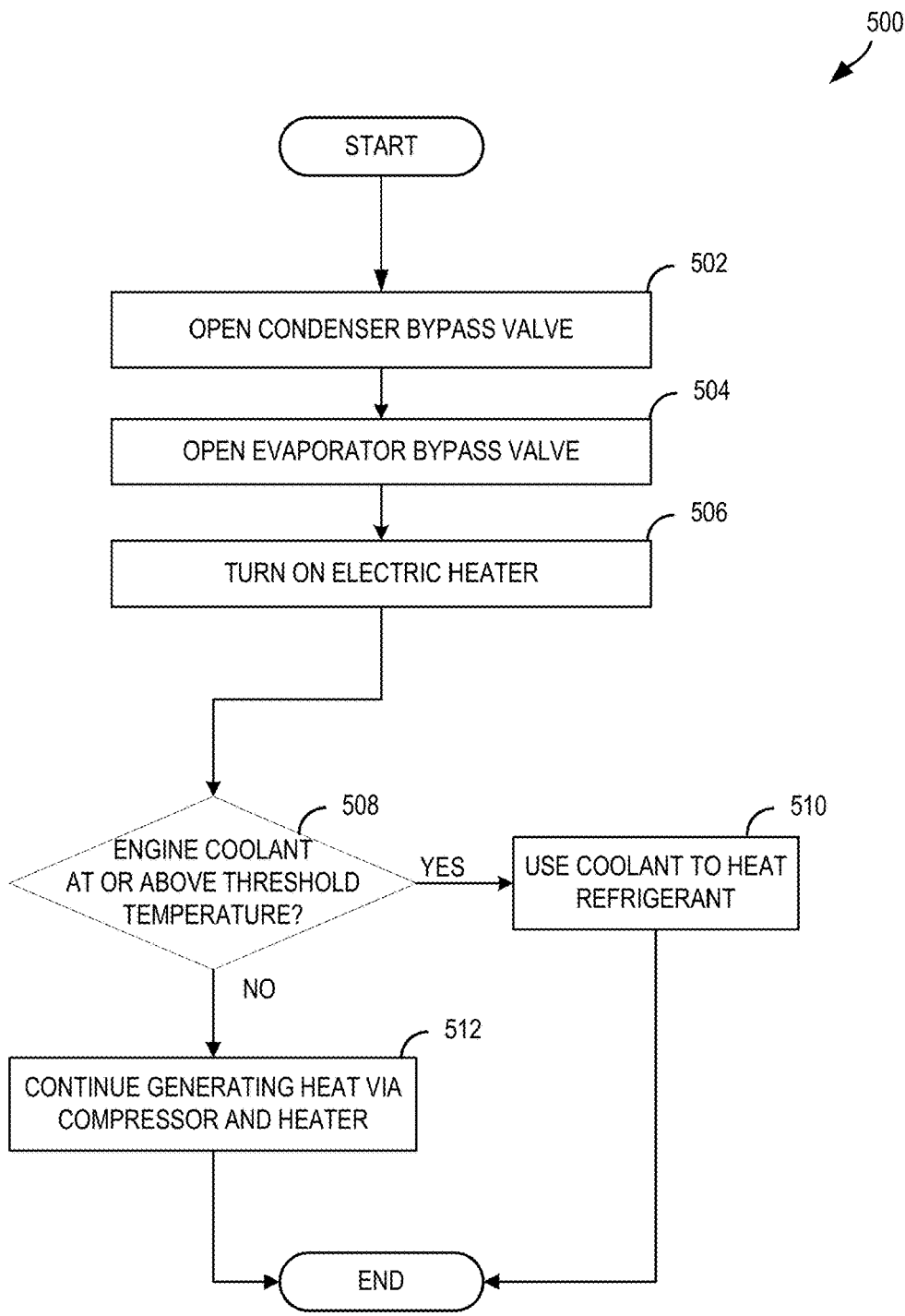
FIG. 5 is a flowchart showing an example method for a first mode of providing instant heat to a cabin of a vehicle.

For example, a speed of the compressor may increase until reaching a first threshold compressor speed (e.g., 750 RPM). At the first threshold compressor speed, a first amount of compression heat is generated (e.g., 3 kW), which may not be sufficient to heat the cabin. If a portion of the first amount of compressor heat is transferred to air blown into the cabin, the temperature of the refrigerant at a compressor inlet may decrease, reducing an inlet density of the refrigerant at the compressor. In response to a reduced inlet density of the refrigerant (e.g., as inferred from a pressure of the refrigerant at a compressor outlet), a rate of increase of the compressor speed may decrease, resulting in a slow rate of heat generation. Alternatively, if a portion of the first amount of compressor heat is not transferred to air blown into the cabin, the temperature of the refrigerant at the compressor inlet may be maintained or may increase (e.g., due to heat from an electric heater), thereby increasing a pressure of the refrigerant and boiling any liquid refrigerant, increasing the inlet density of the refrigerant at the compressor. In response to an increased inlet density of the refrigerant, a rate of increase of the compressor speed may increase, resulting in a rate of heat generation that is faster. The speed of the compressor may increase until reaching a second threshold compressor speed (e.g., 3600 RPM) at a maximum compressor torque. At the second threshold compressor speed, a second amount of compression heat is generated (e.g., 18 kW), which may be sufficient to heat the cabin. If a portion of the second amount of compressor heat is transferred to air blown into the cabin, the temperature of the refrigerant at the compressor inlet may not decrease, maintaining an inlet density of the refrigerant at the compressor. As a result of the inlet density of the refrigerant not decreasing, the maximum compressor torque and the rate of heat generation is maintained. Further, the A/C system may be controlled to ensure that the portion of the second amount of compressor heat that is transferred to air to heat the cabin does not exceed a threshold portion, where exceeding the threshold portion causes the speed of the compressor to decrease below the second threshold compressor speed. In one example, a blower speed is adjusted based on a temperature of the refrigerant at an outlet of the evaporator and a compressor outlet pressure. Referring briefly to FIG. 5, a flowchart shows an example method 500 for adjusting the flow of refrigerant in an A/C system, such as the A/C system 100 of FIG. 1 and/or the A/C system 200 of FIGS. 2A-2E, to provide instant heat to a cabin of a vehicle during a first mode. Method 500 may be carried out as part of method 400 described above.

At 502, method 500 includes opening a condenser bypass valve of the A/C system (e.g., the condenser bypass valve 210 of the A/C system 200 of FIGS. 2A-2E) to allow the refrigerant to bypass the condenser of the A/C system. As described above in reference to FIGS. 2C-2E, by bypassing the condenser, heat generated by the compressor and transferred to the refrigerant is not released at the condenser, but rather maintained in the refrigerant until reaching the evaporator.

At 504, method 500 includes opening an evaporator bypass valve of the A/C system (e.g., the evaporator bypass valve 216 of the A/C system 200 of FIGS. 2A-2E) to allow the refrigerant to bypass the evaporator. As described above in reference to FIGS. 2C and 2D, by bypassing the evaporator, heat generated by the compressor and transferred to the refrigerant is not released at the evaporator, but rather maintained in the refrigerant until reaching the compressor. By bypassing the evaporator and the condenser, a short loop is created between the compressor outlet and the compressor inlet where minimal thermal losses occur. This encourages the temperature of the refrigerant to rise to a boiling point of the refrigerant and increases a density of the refrigerant at the compressor inlet, which maximizes the compressor torque. By driving the compressor torque up to a limit value representing the maximum compressor torque as quickly as possible, an amount of heat generated by the A/C system is maximized. For example, the limit value may be at a belt slip limit, or a clutch slip limit detected by the controller. In one example, the maximum compressor torque is achieved when a threshold pressure is achieved at an outlet of the compressor (e.g., compressor outlet 211 of FIG. 2).

In some examples, opening the evaporator bypass valve may include turning off a blower (e.g., HVAC fan) of the vehicle, to reduce an air flow around components of the A/C system that might draw heat from the refrigerant. Additionally, damper doors may be closed to isolate the evaporator from cabin air (e.g., from an air passage coupling a heater core to the cabin) until the compressor reaches maximum torque.

At 506, method 500 includes turning on an electric heater arranged on a conduit of the A/C system, whereby electric resistance heat generated by the electric heater is transferred to the refrigerant circulating within the conduit of the A/C system. As described above in reference to FIGS. 2A-2E, the electric heater may be positioned upstream of the compressor and proximate the inlet of the compressor, to increase the temperature of the refrigerant at the inlet of the compressor. By increasing the temperature of the refrigerant at the inlet of the compressor, the rate of increase of the speed of the compressor may be increased, or maintained if the compressor is at a maximum compressor speed.

At 508, method 500 includes determining whether a temperature of a coolant of an engine system of the vehicle is at or above a threshold coolant temperature, at which the coolant may be used to further heat the refrigerant in the A/C system (e.g., in addition to the heat generated by the compressor and the electric heater). In one example, the threshold coolant temperature is a temperature that is greater than the temperature of the refrigerant. In other examples, the threshold coolant temperature is a temperature that exceeds the temperature of the refrigerant by a number of degrees. For example, the threshold coolant temperature may be 10° higher than the temperature of the refrigerant, where if the temperature of the coolant exceeds the temperature of the refrigerant by 10°, the coolant may be used to heat the refrigerant.

If at 508 it is determined that the coolant is at or above the threshold coolant temperature, method 500 proceeds to 510. At 510, method 500 includes using the coolant to heat the refrigerant. In one example, the refrigerant is routed through a refrigerant/coolant heat exchanger (e.g., the refrigerant/coolant heat exchanger 234 of A/C system 200 of FIGS. 2A-2E) arranged on a conduit of the A/C system upstream of the electric heater, where heat from the coolant is transferred to the refrigerant. For example, a heat exchange loop valve of the A/C system (e.g., the heat exchange loop valve 217 of FIGS. 2A-2E) may be actuated open to route the refrigerant to the electric heater via the refrigerant/coolant heat exchanger. The refrigerant/coolant heat exchanger may employ any kind of mechanism that transfers heat from a first fluid flowing to a second fluid while keeping the first fluid separate from the second fluid. In one example, the refrigerant/coolant heat exchanger comprises a coil through which the refrigerant flows surrounded by a housing through which the coolant flows. In other examples, the refrigerant/coolant heat exchanger comprises a coil through which the coolant flows surrounded by a housing through which the refrigerant flows, or another type of heat exchanger. In some examples, the heat exchange loop valve may be actuated to various degrees of open or closed to control a flow of the refrigerant through the refrigerant/coolant heat exchanger. For example, as the temperature of the coolant increases (e.g., as the engine warms up) above the temperature of the refrigerant, the heat exchange loop valve may be adjusted to a more open position, to allow more refrigerant to pass through the refrigerant/coolant heat exchanger. By allowing more refrigerant to pass through the refrigerant/coolant heat exchanger, the temperature of the refrigerant may be increased. If the temperature of the coolant does not increase above the temperature of the refrigerant by a threshold temperature difference, the heat exchange loop valve may be adjusted to a more closed position, to allow less refrigerant to pass through the refrigerant/coolant heat exchanger. By allowing a smaller flow of refrigerant to pass through the refrigerant/coolant heat exchanger, the smaller flow of refrigerant may be heated by the refrigerant/coolant heat exchanger whereas a larger flow of refrigerant may not be heated by the refrigerant/coolant heat exchanger.

If at 508 it is determined that the coolant has not reached the threshold coolant temperature, method 500 proceeds to 512. At 512, method 500 includes continuing to generate heat via the compressor and/or the electric heater, and method 500 ends.

Returning to FIG. 4, at 404, method 400 includes determining whether the refrigerant has reached the threshold temperature, whereby the first mode is concluded and the second mode may begin. As described above, the threshold temperature is a temperature at which the compressor is at a maximum torque and generating heat at a maximum rate. Once the refrigerant achieves the threshold temperature, any additional heat absorbed by the refrigerant may be transferred out of the A/C system (e.g., to the cabin) without negatively impacting the amount of heat generated by the compressor. In other words, when the threshold temperature is achieved, a delivery of instant heat to the driver may be initiated without reducing the capacity of the compressor to generate additional heat. In other non-limiting embodiments, at 404, method 400 does include determining whether the refrigerant has reached the threshold temperature, and method 400 includes determining whether a pressure of the refrigerant has reached a threshold pressure, or whether a speed of the compressor is at or above a threshold speed, or whether another parameter indicates that a torque of the compressor has achieved a maximum torque.

If at 404 it is determined that the refrigerant has not achieved the threshold temperature, method 400 proceeds to 406. At 406, method 400 includes continuing to heat the refrigerant (e.g., via the compressor and/or the electric heater and/or the coolant) until the refrigerant achieves the threshold temperature, and method 400 proceeds back to 402. If at 404 it is determined that the refrigerant has achieved the threshold temperature, method 400 proceeds to 408.

At 408, method 400 includes initiating the second mode of instant heat. During the second mode of instant heat, excess heat generated by the compressor (e.g., heat that increases the temperature of the refrigerant above the threshold temperature) may be transferred to air that may be blown into the cabin to generate a flow of hot air (e.g., the instant heat). In other words, once the maximum compressor torque is achieved, the short loop bypassing the evaporator and coupling the compressor outlet to the compressor inlet is no longer used, and heat generated in the refrigerant is transferred to cabin air via the evaporator. In the second mode, just enough heat is removed from the refrigerant prior to reaching the compressor inlet to keep the compressor torque at or close to the maximum torque.

At 410, initiating the second mode of instant heat includes closing the evaporator bypass valve, thereby routing the refrigerant to the evaporator. At the evaporator, the refrigerant may be channeled into a plurality of evaporation channels, each evaporation channel including one or more surfaces across which air may flow. In one example, air is blown across the one or more surfaces by a blower of the vehicle (e.g., the blower 220 of FIGS. 2A-2E), resulting in a transfer of heat from the refrigerant to the air, which may be channeled down an air passage to the cabin to generate the flow of hot air into the cabin. In some examples, closing the evaporator bypass valve includes opening the damper doors to expose the evaporator to air in the air passage.

At 412, initiating the second mode of instant heat includes adjusting a speed of the blower and/or other parameters of the A/C system, based on the temperature and/or pressure of the refrigerant, to maintain the speed of the compressor (e.g., at the maximum compressor torque). As heat is transferred to the air flowing across the one or more surfaces of each evaporation channel of the evaporator, the temperature of the refrigerant decreases. If the blower speed is increased, more air will flow across the evaporator, resulting in a larger decrease in the temperature of the refrigerant and a larger subsequent decrease in compressor torque. If the blower speed is decreased, less air will flow across the evaporator, resulting in a smaller decrease in the temperature of the refrigerant and a smaller subsequent decrease or a relative increase in compressor torque. Thus, the blower speed may be adjusted dynamically by the controller to transfer heat from the refrigerant at a desired rate, where the desired rate is a rate at which maximum compressor torque is maintained.

For example, when the compressor is at the maximum compressor speed, if as a result of a high blower speed the temperature of the refrigerant at the compressor inlet falls below the threshold temperature, the blower speed may be reduced, which may cause the temperature of the refrigerant at the compressor inlet to increase to maintain the compressor at the maximum compressor speed. Alternatively, if the temperature of the refrigerant at the compressor inlet increases above the threshold temperature (e.g., as inferred by a pressure of the refrigerant measured at the compressor outlet), the blower speed may be increased, whereby more heat may be directed to the cabin without reducing the compressor speed.

At 414, method 400 includes determining whether instant heat is still desired. In one example, instant heat is still desired if a temperature of the cabin has not achieved a threshold or desired cabin temperature. In another example, instant heat may not be desired when the driver or a user of the vehicle adjusts a dashboard control indicating that heat is no longer desired. In another example, instant heat is no longer desired when engine waste heat becomes available. For example, upon an engine start, the engine and coolant may be cold, where no engine waste heat is produced. As the engine warms up, a temperature of the coolant may increase. When the temperature of the coolant exceeds a first threshold coolant temperature, where the first threshold coolant temperature is higher than the temperature of the refrigerant, engine waste heat may be available for heating the refrigerant, as described above in reference to method 500 of FIG. 5. When the temperature of the coolant exceeds a second threshold coolant temperature, where the second threshold coolant temperature is higher than first threshold coolant temperature and the temperature of the cabin, engine waste heat may become available to heat the cabin, where a flow of hot air may be generated via an air-coolant heat exchanger (e.g., heater core) positioned in an air passage of the vehicle leading to the cabin, and the blower may blow the air into the cabin to provide in-cabin heat. If engine waste heat is available, the instant heat may no longer be desired, since engine waste heat may be more efficient than instant heat and a cost of the engine waste heat may be lower than instant heat.

If at 414 it is determined that instant heat is still desired, method 400 proceeds back to 412, where method 400 includes adjusting the blower speed. If at 414 it is determined that instant heat is no longer desired, method 400 proceeds to 416. At 416, method 400 includes terminating instant heat, and method 400 ends. In one example, terminating instant heat includes stopping heating of the refrigerant by turning off the compressor and at least one of reducing a speed of the engine, reducing a displacement of the compressor, closing the condenser bypass valve, closing the evaporator bypass valve, closing the heat exchange loop valve, and turning the electric heater off.

Figure 6:
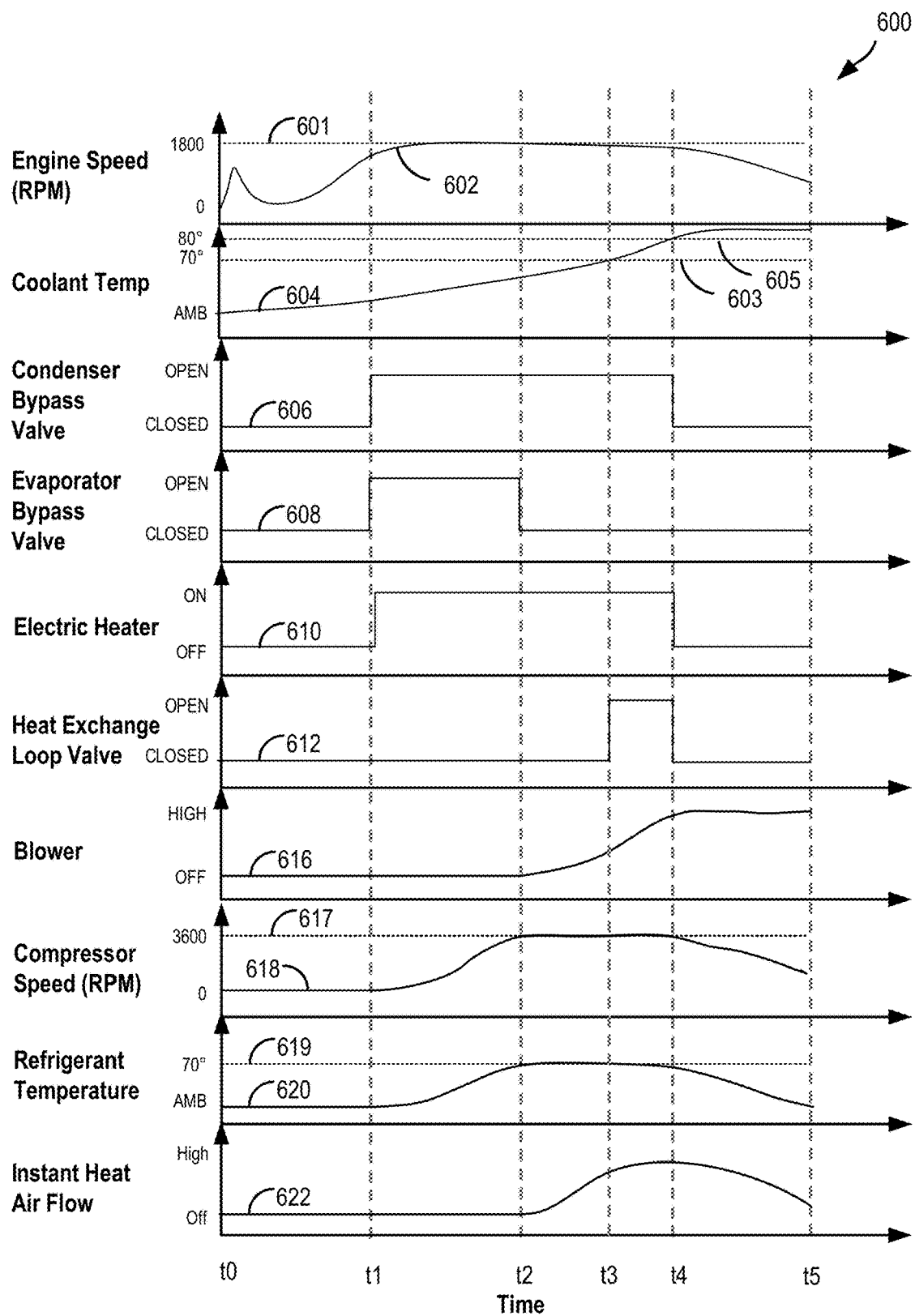
FIG. 6 is a timing diagram indicating a timing of operations performed to provide instant heat to a cabin of a vehicle.

Referring now to FIG. 6, an operating sequence 600 is shown that illustrates a timing of an example routine for providing instant heat to a cabin of a vehicle via an A/C system of the vehicle, such as the A/C system 100 of FIG. 1 and/or the A/C system 200 of FIGS. 2A-2E. The horizontal (x) axis denotes time and the vertical lines t0-t5 identify significant times in the operation of the instant heat routine.

The operating sequence 600 includes ten plots. In a first plot, a line 602 shows an engine speed of the vehicle. In a second plot, a line 604, shows a temperature of an engine coolant of the engine, where prior to starting the vehicle, the temperature of the engine coolant may be an ambient temperature (AMB). In a third plot, a line 606 shows a position of a condenser bypass valve of the A/C system (e.g., the condenser bypass valve 210 of the A/C system 200 of FIGS. 2A-2E). For example, when the condenser bypass valve is CLOSED, a refrigerant circulating through the A/C system enters a condenser of the A/C system. When the condenser bypass valve is OPEN, the refrigerant does not enter the condenser of the A/C system, and is routed around the condenser to bypass the condenser. In a fourth plot, a line 608 shows a position of an evaporator bypass valve of the A/C system (e.g., the evaporator bypass valve 216 of the A/C system 200 of FIGS. 2A-2E). For example, when the evaporator bypass valve is CLOSED, the refrigerant circulating through the A/C system enters an evaporator of the A/C system. When the evaporator bypass valve is OPEN, the refrigerant does not enter the evaporator of the A/C system, and is routed around the evaporator to bypass the evaporator. In a fifth plot, a line 612 shows a status of an electric heater of the A/C system (e.g., the electric heater 208 of the A/C system 200 of FIGS. 2A-2E). For example, when the electric heater is ON, resistance heat is generated by the electric heater, which may heat the refrigerant circulating through the A/C system. When the electric heater is OFF, resistance heat is not generated by the electric heater, whereby no heat is transferred to the refrigerant circulating through the A/C system. In a sixth plot, a line 612 shows a position of a heat exchange loop valve of the A/C system (e.g., the heat exchange loop valve 217 of the A/C system 200 of FIGS. 2A-2E). For example, when the heat exchange loop valve is CLOSED, the refrigerant circulating through the A/C system passes from the evaporator to the electric heater of the A/C system without passing through a refrigerant/coolant heat exchanger. When the heat exchange loop valve is OPEN, the refrigerant is routed from the evaporator to the electric heater through the refrigerant/coolant heat exchanger, where heat may be transferred from a coolant of an engine of the vehicle to the refrigerant. In a seventh plot, a line 616 shows a status of a blower of the A/C system (e.g., the blower 220 of the A/C system 200 of FIGS. 2A-2E). The blower may be positioned within an air passage leading to the cabin of the vehicle, where the blower may blow air over the evaporator. As the air is blown over the evaporator, heat from the refrigerant in the evaporator may be transferred to the air, generating a flow of hot air in the cabin. The blower may be adjusted to adjust a flow of the air over the evaporator. For example, when the blower is OFF, no air may be blown over the evaporator. When the blower is at a first setting, a first flow of air may be generated by the blower; when the blower is at a second setting, a second flow of air may be generated by the blower, where the second flow of air is faster than the first flow of air; when the blower is at a third setting, a third flow of air may be generated by the blower, where the third flow of air is faster than the second flow of air; and so on. In an eighth plot, a line 618 shows a speed of a compressor of the AC system. In one example, the compressor is used to pressurize the refrigerant, thereby generating heat and a circulation of the refrigerant through the A/C system. In a ninth plot, a line 620 shows a temperature of the refrigerant at an inlet of the compressor, where prior to starting the vehicle, the temperature of the refrigerant may be an ambient temperature (AMB). In a tenth plot, a line 620 shows an air flow of in-cabin instant heat generated by the A/C system. For example, the air flow may be low, where little instant heat is delivered to the cabin, or the air flow may be high, where more instant heat is delivered to the cabin. In one example, the instant heat is generated by at least one of a compressor of the A/C system, the electric heater, and the refrigerant/coolant heat exchanger, transferred to the refrigerant circulating through the A/C system, and transferred to air used to heat the cabin.

At time t0, the engine is turned on. Prior to initiating the instant heat routine, the condenser bypass valve is CLOSED, the evaporator bypass valve is CLOSED, and the heat exchange loop valve is CLOSED. The electric heater is OFF and the blower is OFF, and the compressor is turned off. The temperature of the refrigerant is an ambient temperature of the vehicle, and no instant heat is provided to the cabin of the vehicle. Between time t0 and t1, the engine speed increases, as shown by line 602. As the engine speed increases, the engine temperature begins to increase.

At time t1, instant heat is requested by a driver of the vehicle, initiating a first mode of instant heat. In one example, the instant heat is requested by the driver selecting a dashboard control of the vehicle. As described above in reference to FIGS. 4 and 5, during the first mode of instant heat, heat generated by the compressor is allowed to build up until the compressor reaches a maximum compressor torque. Upon initiation of the instant heat routine, the condenser bypass valve is actuated OPEN and the evaporator bypass valve is activated OPEN, as shown by lines 606 and 608. The compressor is turned on, and as the compressor speed increases, as shown by line 618, heat begins to be generated in the A/C system due to a pressurization of the refrigerant at the compressor, and the refrigerant begins to circulate throughout the A/C system. As a result of the condenser bypass valve and the evaporator bypass valve being OPEN, the refrigerant is routed around the condenser and the evaporator, coupling a compressor outlet to a compressor inlet, thereby trapping and accumulating heat in the A/C system. Additionally, the electric heater is actuated ON, whereby resistance heat generated by the electric heater is transferred to the refrigerant to further heat the refrigerant (e.g., in addition to the compressor).

At time t1, the engine coolant temperature has increased slightly, as shown by line 604, but is not yet high enough to provide heat to the A/C system. To shorten a time until engine waste heat may be used to heat the cabin, the engine speed is increased, as shown by line 602. In the depicted example the vehicle is not moving, and the engine speed is increased by increasing an engine idle speed of the vehicle to a threshold engine idle speed indicated by dotted line 601, where the threshold engine idle speed is higher than a typical engine idle speed. In one example, the threshold engine idle speed is 1800 RPM. In other examples (e.g., when the vehicle is moving), the engine speed is increased by delaying an upshifting of one or more gears of a transmission of the vehicle, whereby the vehicle is operated with the transmission in a lower gear ratio than during typical vehicle operation. An air flow of instant heat is not yet provided, as shown by line 622.

From time t1 to t2, the compressor speed shown by line 616 increases to a maximum compressor speed, indicated by line 617, at which a maximum torque is generated by the compressor. In one example, the maximum compressor speed is 3600 RPM. As the compressor speed increases, the temperature of the refrigerant increases, due to a pressurization of the refrigerant by the compressor and an absorption of resistance heat from the electric heater. The blower is maintained off.

At time t2, the compressor reaches the maximum compressor speed indicated by dotted line 617, as shown by line 618. At the maximum compressor speed, the refrigerant temperature has reached a threshold temperature, shown by dotted line 619, where the temperature of the refrigerant is sufficient to begin providing instant heat to the cabin. In one example, the threshold temperature is 70°, corresponding to a threshold pressure of 300 psi. In response to the temperature of the refrigerant reaching the threshold temperature, the first mode of operation of the instant heat routine ends and a second mode of operation of the instant heat routine begins. In one example, t2 occurs roughly 70 seconds after t0. In the second mode, the evaporator bypass valve is actuated CLOSED, as shown by line 608, and the refrigerant begins to circulate through the evaporator. As the refrigerant circulates through the evaporator, heat is transferred from the refrigerant to air around the evaporator. The blower is turned on, as shown by line 616, which blows the heated air to the cabin to provide the instant heat.

Between time t2 and t3, as more heat is generated by the A/C system, the blower speed is increased, as shown by line 616. As the blower speed increases, the amount of instant heat provided increases, as shown by line 622, while the temperature of the refrigerant remains constant, as shown by line 620 (e.g., heat in excess of an amount of heat used to maintain the temperature of the refrigerant is diverted to the cabin). At time t3, the temperature of the engine coolant reaches a first threshold coolant temperature, where the first threshold coolant temperature is a temperature at which the engine coolant is sufficiently hot to transfer heat to the refrigerant via the refrigerant/coolant heat exchanger. As a result of the engine coolant being sufficiently hot to transfer heat to the refrigerant via the refrigerant/coolant heat exchanger, the heat exchange loop valve is actuated open, as shown by line 612, thereby routing the refrigerant through the refrigerant/coolant heat exchanger.

Between time t3 and t4, the refrigerant is being heated by the compressor, the electric heater, and the engine coolant. However, the refrigerant temperature (shown by line 620) is held constant by increasing the blower speed, resulting in an increase in instant heat provided to the cabin, as shown by line 622. The engine coolant temperature continues to increase as the engine heats up, as shown by line 604. At time t4, the engine coolant reaches a second threshold coolant temperature, where the second threshold coolant temperature is a temperature at which the engine coolant is sufficiently hot to transfer heat to the cabin via an air/coolant heat exchanger (e.g., a heater core). As a result of the engine coolant being sufficiently hot to transfer heat to the cabin, the second mode of operation of the instant heat routine ends, and instant heat is ended as it is replaced by engine waste heat via the heater core, as shown by line 622. In one example, t4 occurs roughly 5 minutes after t0. The electric heater is turned OFF, the condenser bypass valve is actuated CLOSED, and the heat exchange loop valve is actuated CLOSED. The increased engine idle speed and/or delayed upshifting of the one or more gears of the transmission are discontinued, and the engine speed decreases, as shown by line 602. The temperature of the engine coolant may continue to rise and/or taper off as the engine speed decreases. The compressor is turned off, and the compressor speed decreases, as shown by line 618. As a result of turning the compressor and the electric heater off, the temperature of the refrigerant decreases. In the depicted example, the blower remains on, but a heat transfer from the evaporator to the air becomes replaced by a heat transfer from the heater core to the air. In other examples, the blower may be turned off, and a second, different blower may be used to blow air heated by the heater core to the cabin. At time t5, the instant heat has concluded, and in-cabin heat is generated by engine waste heat via the engine coolant.

Thus, by accumulating heat in the refrigerant in the first mode and not transferring the heat to air at the evaporator, an amount of time taken for the temperature of the refrigerant to reach the threshold temperature at the compressor inlet and for the compressor to reach maximum torque is minimized. A maximum transfer of heat from the electric heater to the refrigerant may be achieved by positioning the electric heater proximate the compressor inlet, and/or wrapping the refrigerant/coolant heat exchanger. Once the threshold temperature is achieved and the compressor is at maximum torque, excess heat generated at the compressor (e.g., by increasing a pressure of the refrigerant) may be transferred to air to be blown to the cabin without reducing the compression speed. The instant heat may be generated automatically during remote starts, to reduce a number of remote starts initiated by the driver to sufficiently heat the cabin prior to operating the vehicle. In this way, by delaying a delivery of instant heat to the cabin until maximum compressor torque is achieved, an overall waiting time for instant heat may be minimized. Further, the delivery of heat to the cabin may be controlled by the blower, such that a first heat used to maintain the refrigerant at the threshold temperature may not be transferred to air to heat the cabin, while a second heat in excess of the first heat is transferred to air to heat the cabin. Once the engine has warmed up and a threshold engine coolant temperature is achieved, in-cabin heat may be provided via a heater core, and instant heat via the A/C system may be discontinued. Additionally, an engine speed may be increased to accelerate warming the engine up, for example, by increasing an engine idle speed or by delaying an upshifting of the vehicle. In yet other examples, the vehicle may be connected to an external energy source, and refrigerant may not be heated via the compressor, and the refrigerant may be heated by the electric heater to deliver the instant heat. Overall, by reducing a time taken for heat to be generated in the vehicle cabin, a use of remote starts to heat the vehicle may be reduced, increasing a fuel efficiency of the vehicle, and a time taken to heat the cabin may be minimized, increasing a comfort level of the driver.

The disclosure also provides support for a method for a controller of a vehicle, comprising: in response to a request for heat in a cabin of the vehicle: heating refrigerant in a refrigerant loop of an air conditioning (A/C) system of the vehicle via a compressor, in a first mode, opening an evaporator bypass valve on an evaporator bypass conduit of the A/C system to route the refrigerant around an evaporator of the A/C system to increase a temperature of the refrigerant in the refrigerant loop, in a second mode, closing the evaporator bypass valve to route the refrigerant through the evaporator, heating the vehicle cabin by flowing air across the evaporator to the vehicle cabin. In a first example of the method, the method further comprises transitioning from the first mode to the second mode after a threshold duration. In a second example of the method, optionally including the first example, the method further comprises: transitioning from the first mode to the second mode in response to at least one of the temperature of the refrigerant increasing to a threshold temperature, a pressure of the refrigerant increasing to a threshold pressure, and a speed of the compressor increasing to a threshold speed. In a third example of the method, optionally including one or both of the first and second examples, an electric heater is arranged on the refrigerant loop at an inlet of the compressor, and heating the refrigerant further comprises increasing a resistance heat of the electric heater to heat the refrigerant immediately prior to entering the compressor. In a fourth example of the method, optionally including one or more or each of the first through third examples, the method further comprises, in response to being connected to an external energy source, not heating the refrigerant via the compressor, and heating the refrigerant via the electric heater powered by the external energy source. In a fifth example of the method, optionally including one or more or each of the first through fourth examples, in response to a temperature of an engine coolant of the vehicle being at or above a first threshold coolant temperature, the first threshold coolant temperature higher than the temperature of the refrigerant, the refrigerant is routed through a refrigerant/coolant heat exchanger arranged on the refrigerant loop to further heat the refrigerant prior to entering the compressor. In a sixth example of the method, optionally including one or more or each of the first through fifth examples, in response to the temperature of the engine coolant of the vehicle reaching a second threshold coolant temperature, the second threshold coolant temperature greater than the first threshold coolant temperature and greater than a temperature of the vehicle cabin, stopping heating the refrigerant in the refrigerant loop. In a seventh example of the method, optionally including one or more or each of the first through sixth examples, the electric heater is arranged around the refrigerant/coolant heat exchanger, and the electric heater heats the engine coolant and the refrigerant. In an eighth example of the method, optionally including one or more or each of the first through seventh examples, the method further comprises, in response to the request for heat in the vehicle cabin, increasing an engine idle speed of the vehicle to increase the temperature of the engine coolant. In a ninth example of the method, optionally including one or more or each of the first through eighth examples, the method further comprises, in response to a driver of the vehicle engaging one or more gears of a transmission of the vehicle, delaying an engagement of a higher gear to operate the vehicle at an increased engine speed to increase the temperature of the engine coolant. In a tenth example of the method, optionally including one or more or each of the first through ninth examples, the method further comprises reducing a speed of a blower of the vehicle in the first mode to reduce a flow of air across the evaporator to the vehicle cabin, and increasing a speed of the blower during the second mode to increase a flow of air across the evaporator to the vehicle cabin. In a eleventh example of the method, optionally including one or more or each of the first through tenth examples, the method further comprises adjusting the speed of the blower based on one of the temperature of the refrigerant, a pressure of the refrigerant, and a speed of the compressor. In a twelfth example of the method, optionally including one or more or each of the first through eleventh examples, the method further comprises automatically generating the request for heat in the vehicle cabin in response to both of a driver of the vehicle initiating a remote start of the vehicle and an ambient temperature being below a threshold temperature.

The disclosure also provides support for a system for a vehicle, comprising a controller, storing instructions in non-transitory memory that, when executed, cause the controller to, in a first mode, close a condenser bypass valve of a condenser of an air conditioning (A/C) system of the vehicle, close an evaporator bypass valve of an evaporator of the A/C system, turn on a compressor of the A/C system to heat a refrigerant and create a flow of the refrigerant through the A/C system, increase a resistance heat of an electric heater of the A/C system to further heat the refrigerant; and in a second mode, open the evaporator bypass valve to allow the refrigerant to circulate through the evaporator and heat air around the evaporator, turn on a blower of the vehicle to blow the heated air into a cabin of the vehicle. In a first example of the system, the controller includes further instructions to initiate the second mode responsive to a temperature of the refrigerant at an inlet of the compressor being at or above a threshold temperature or a pressure of the refrigerant at the inlet of the compressor being at or above a threshold pressure. In a second example of the system, optionally including the first example, the controller includes further instructions to, in response to an engine coolant of the vehicle reaching a first threshold coolant temperature, open a heat exchange loop valve positioned on a heat exchange loop of the A/C system to route the refrigerant through a refrigerant/coolant heat exchanger to further heat the refrigerant upstream of an inlet of the compressor.

The disclosure also provides support for a method for a controller of an A/C system of a vehicle, comprising, in a first mode of operation, in response to an evaporator of the A/C system being bypassed: reducing a speed of a blower of the A/C system, and in a second mode of operation, in response to the evaporator not being bypassed: increasing a speed of the blower responsive a temperature of a refrigerant increasing above a threshold temperature. In a first example of the method, an auxiliary throttle is arranged between the evaporator and a compressor of the A/C system. In a second example of the method, optionally including the first example, the blower is positioned in an air passage leading to a cabin of the vehicle, and increasing the speed of the blower increases a temperature of the cabin. In a third example of the method, optionally including one or both of the first and second examples, the first mode of operation ends and the second mode of operation begins responsive to one of a temperature of the refrigerant at an inlet of a compressor of the A/C system being at or above a threshold temperature and a speed of the compressor being at or above a threshold speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a controller of a vehicle, comprising:
in response to a request for heat in a cabin of the vehicle:
heating refrigerant in a refrigerant loop of an air conditioning (A/C) system of the vehicle via a compressor, wherein the A/C system comprises a single evaporator;
in a first mode, opening an evaporator bypass valve on an evaporator bypass conduit of the A/C system to route the refrigerant around the evaporator of the A/C system to increase a temperature of the refrigerant in the refrigerant loop;
in a second mode, closing the evaporator bypass valve to route the refrigerant through the evaporator; and
heating the vehicle cabin by flowing air across the evaporator to the vehicle cabin.

2. The method of claim 1, further comprising transitioning from the first mode to the second mode after a threshold duration, wherein the refrigerant does not pass through any evaporator of the A/C system in the first mode.

3. The method of claim 1, further comprising transitioning from the first mode to the second mode in response to at least one of the temperature of the refrigerant increasing to a threshold temperature, a pressure of the refrigerant increasing to a threshold pressure, and a speed of the compressor increasing to a threshold speed.

4. The method of claim 1, wherein an electric heater is arranged on the refrigerant loop at an inlet of the compressor, and heating the refrigerant further comprises increasing a resistance heat of the electric heater to heat the refrigerant immediately prior to entering the compressor.

5. The method of claim 4, further comprising, in response to being connected to an external energy source, not heating the refrigerant via the compressor, and heating the refrigerant via the electric heater powered by the external energy source.

6. The method of claim 4, wherein in response to a temperature of an engine coolant of the vehicle being at or above a first threshold coolant temperature, the first threshold coolant temperature higher than the temperature of the refrigerant, the refrigerant is routed through a refrigerant/coolant heat exchanger arranged on the refrigerant loop to further heat the refrigerant prior to entering the compressor.

7. The method of claim 6, wherein in response to the temperature of the engine coolant of the vehicle reaching a second threshold coolant temperature, the second threshold coolant temperature greater than the first threshold coolant temperature and greater than a temperature of the vehicle cabin, stopping heating the refrigerant in the refrigerant loop.

8. The method of claim 6, wherein the electric heater is arranged around the refrigerant/coolant heat exchanger, and the electric heater heats the engine coolant and the refrigerant.

9. The method of claim 6, further comprising, in response to the request for heat in the vehicle cabin, increasing an engine idle speed of the vehicle to increase the temperature of the engine coolant.

10. The method of claim 6, further comprising, in response to a driver of the vehicle engaging one or more gears of a transmission of the vehicle, delaying an engagement of a higher gear to operate the vehicle at an increased engine speed to increase the temperature of the engine coolant.

11. The method of claim 1, further comprising reducing a speed of a blower of the vehicle in the first mode to reduce a flow of air across the evaporator to the vehicle cabin, and increasing a speed of the blower during the second mode to increase a flow of air across the evaporator to the vehicle cabin.

12. The method of claim 11, further comprising adjusting the speed of the blower based on one of the temperature of the refrigerant, a pressure of the refrigerant, and a speed of the compressor.

13. The method of claim 1, further comprising automatically generating the request for heat in the vehicle cabin in response to both of a driver of the vehicle initiating a remote start of the vehicle and an ambient temperature being below a threshold temperature.

14. A method for a controller of a vehicle, comprising:
in response to a request for heat in a cabin of the vehicle:
heating refrigerant in a refrigerant loop of an air conditioning (A/C) system of the vehicle via a compressor;
in a first mode, opening an evaporator bypass valve on an evaporator bypass conduit of the A/C system to route the refrigerant around an evaporator of the A/C system to increase a temperature of the refrigerant in the refrigerant loop;
in a second mode, closing the evaporator bypass valve to route the refrigerant through the evaporator;
heating a vehicle cabin by flowing air across the evaporator to the vehicle cabin;
transitioning from the first mode to the second mode after a threshold duration; and
transitioning from the first mode to the second mode in response to at least one of the temperature of the refrigerant increasing to a threshold temperature, a pressure of the refrigerant increasing to a threshold pressure, and a speed of the compressor increasing to a threshold speed.

15. A method for a controller of a vehicle, comprising:
in response to a request for heat in a cabin of the vehicle:
heating refrigerant in a refrigerant loop of an air conditioning (A/C) system of the vehicle via a compressor;
in a first mode, opening an evaporator bypass valve on an evaporator bypass conduit of the A/C system to route the refrigerant around an evaporator of the A/C system to increase a temperature of the refrigerant in the refrigerant loop;
in a second mode, closing the evaporator bypass valve to route the refrigerant through the evaporator;
heating a vehicle cabin by flowing air across the evaporator to the vehicle cabin, wherein an electric heater is arranged on the refrigerant loop at an inlet of the compressor, and heating the refrigerant further comprises increasing a resistance heat of the electric heater to heat the refrigerant immediately prior to entering the compressor; and in response to being connected to an external energy source, not heating the refrigerant via the compressor, and heating the refrigerant via the electric heater powered by the external energy source.

* * * * *